(12) United States Patent
Sneed et al.

(10) Patent No.: US 10,922,207 B2
(45) Date of Patent: Feb. 16, 2021

(54) METHOD, APPARATUS, AND COMPUTER-READABLE MEDIUM FOR MAINTAINING VISUAL CONSISTENCY

(71) Applicant: Sparta Systems, Inc., Hamilton, NJ (US)

(72) Inventors: Timothy Sneed, Beachwood, NJ (US); Bruce Kratz, Moorestown, NJ (US)

(73) Assignee: SPARTA SYSTEMS, INC., Hamilton, NJ (US)

(*) Notice: Subject to any disclaimer, the term of this patent is extended or adjusted under 35 U.S.C. 154(b) by 0 days.

(21) Appl. No.: 16/281,710

(22) Filed: Feb. 21, 2019

(65) Prior Publication Data
US 2020/0272554 A1 Aug. 27, 2020

(51) Int. Cl.
*G06F 11/36* (2006.01)

(52) U.S. Cl.
CPC ...... *G06F 11/3604* (2013.01); *G06F 11/3688* (2013.01)

(58) Field of Classification Search
CPC ... G06F 11/3604; G06F 17/18; G06F 11/3688
See application file for complete search history.

(56) References Cited

U.S. PATENT DOCUMENTS

| | | | | |
|---|---|---|---|---|
| 9,600,400 B1* | 3/2017 | McDowell | .......... | G06F 11/3428 |
| 9,852,049 B2* | 12/2017 | Hey | .................... | G06F 11/3692 |
| 2007/0006043 A1* | 1/2007 | Pins | .................... | G06F 11/3688 |
| | | | | 714/38.14 |
| 2016/0275003 A1* | 9/2016 | Balakrishnan | ...... | G06F 11/3672 |
| 2017/0277374 A1* | 9/2017 | Ozcan | .................... | G06F 40/197 |
| 2018/0060222 A1* | 3/2018 | Kogan | ....................... | G06F 8/70 |
| 2019/0324890 A1* | 10/2019 | Li | ............................. | G06F 8/38 |

OTHER PUBLICATIONS

Mikko Vesikkala, "Visual Regression Testing for Web Applications" (Year: 2014).*
Sarah Lim, "Ply: Visual Regression Pruning for Web Design Source Inspection" (Year: 2017).*

* cited by examiner

*Primary Examiner* — Phillip H Nguyen
(74) *Attorney, Agent, or Firm* — Amardeep S. Grewal; Reed Smith LLP

(57) ABSTRACT

An apparatus, method and computer-readable medium for maintaining visual consistency of a presentation layer of an application, including receiving images and associated metadata from client-side computing devices, the associated metadata indicating a corresponding feature and a corresponding state for each image, retrieving a baseline image corresponding to each image from a server-side memory based on the corresponding feature and the corresponding state for each image, performing a visual regression analysis between each image and the corresponding baseline image to determine values of indicators, and transmitting alerts to client-side computing devices based at least in part on a determination that a value of an indicator is outside of a predetermined range of values or does not match an expected value of the indicator.

30 Claims, 16 Drawing Sheets

METHOD, APPARATUS, AND COMPUTER-READABLE MEDIUM FOR MAINTAINING VISUAL CONSISTENCY

BACKGROUND

User-facing software applications have several layers, including a presentation layer (such as a user interface layer), an application layer (such as a service or controller layer), a business layer (the business logic and domain information), and the data access layer (persistence, networking, etc.).

As software applications, such as web applications, grow larger over time, it becomes important to perform regular audits of the application's presentation layer to ensure visual consistency within the company portfolio. These audits can occur on many levels, for example:

Foundational user interface (UI) elements, such as a core style guide for a company governing formats, color palettes, fonts, etc.;

Re-usable widgets/components, which are elements within the interface (e.g., a web page) that provide user functionality;

Targeted functional slices, which track all visual representations of a particular product feature, such as in different components of an interface; and The entire application experience, meaning the overall presentation and organization of different facets of the presentation layer.

It is important from both a high level and a low level to track visual changes to application features between release cycles. From a high level, this tracking ensures that user experience changes between cycles are documented, highlights functional areas to target for visual regression testing, supports a validation package deliverable to customers, and provides content to technical writers for user guide documentation.

Additionally, from a low level, it is especially important to track visual changes within shared libraries, such as a company style guide, or a library of shared UI components that is used between multiple applications. Maintainers of these shared resources have an obligation to notify their consumers of changes so that unexpected results are not realized downstream in quality assurance. Understanding upstream differences from shared libraries enables application projects to react and understand how those changes will visually impact an application.

One prior solution to maintaining visual consistency is to manually take screenshots of areas of interest in the application, or foundational UI building blocks, and review them over time. Historically, reviewers would maintain a history of their screenshots in their local file system.

However, in businesses with a portfolio of applications supporting their customers, it can be too cumbersome and time consuming to perform manual audits of visual consistency. Thus, visual regression may only occur a few times a year, during release cycles, or on an ad-hoc basis. Given the size of a web application, the scope of manual visual regression may be limited to a small subset of the application. With the limited scope, there is an increased risk of missing unexpected changes to other areas of the application. Due to the repetitive nature of this comparison process, the number of human errors is directly proportional to the number of features being monitored for visual change.

Due to the piecemeal and manual review performed on various elements of the presentation layer by disparate users, existing methods for ensuring visual consistency are not able to be integrated into automated development pipelines, such as continuous integration (CI) tools. In most cases, a balance must be struck between the number of features to audit and the amount of time given to perform regression and validation. This process is a bottleneck to releasing at a quicker interval.

Accordingly, improvements are needed in systems for maintaining visual consistency across a presentation layer of an application.

DETAILED DESCRIPTION

Figure 1:
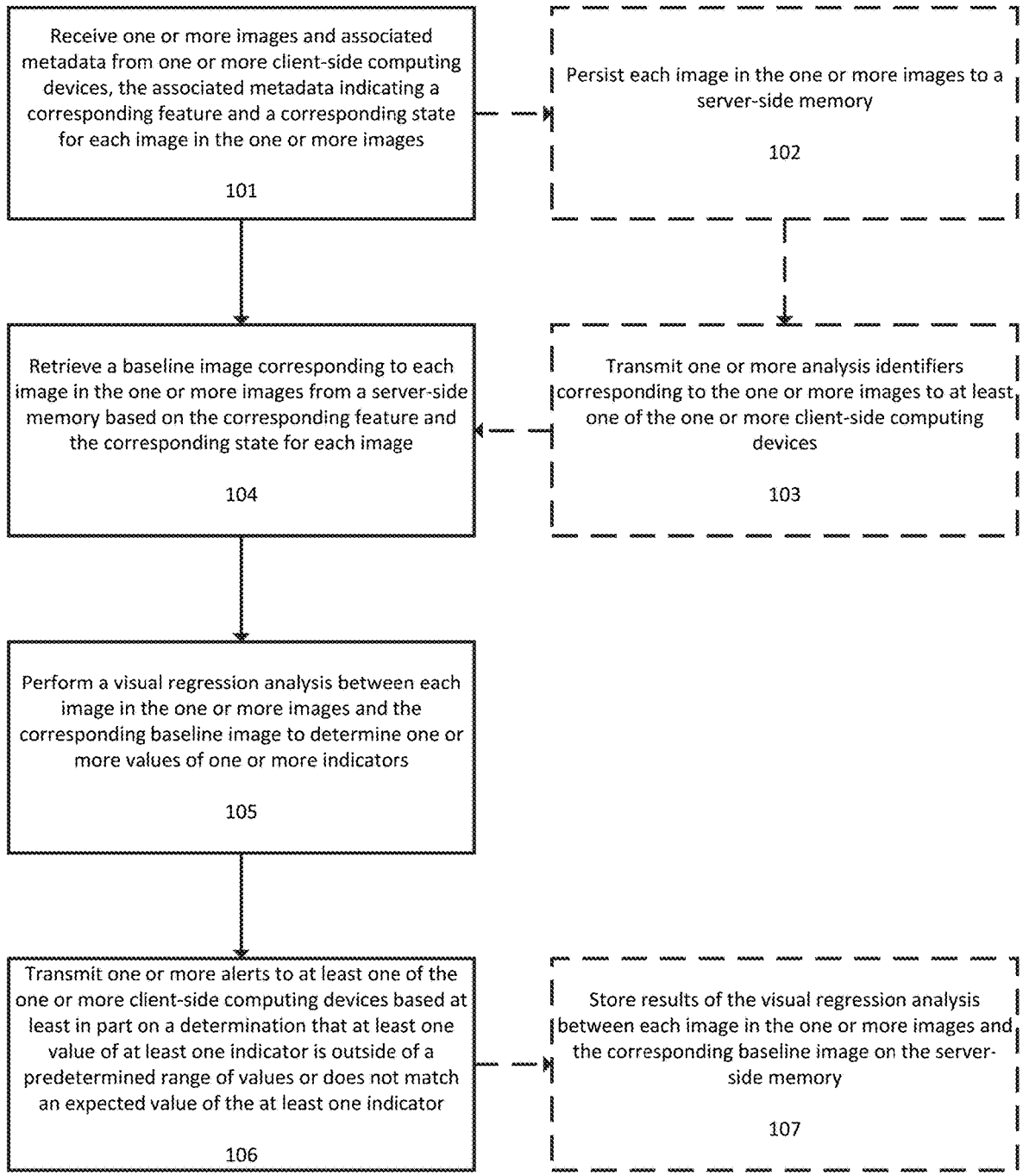
FIG. 1 illustrates a flowchart for a method for maintaining visual consistency of the presentation layer of an application, according to an exemplary embodiment.

While methods, apparatuses, and computer-readable media are described herein by way of examples and embodiments, those skilled in the art recognize that methods, apparatuses, and computer-readable media for maintaining visual consistency are not limited to the embodiments or drawings described. It should be understood that the drawings and description are not intended to be limited to the particular forms disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," "includes", "comprise," "comprises," and "comprising" mean including, but not limited to.

As discussed above, improvements are needed in systems for maintaining visual consistency. Applicant has discovered novel methods, apparatuses, and computer-readable media for maintaining visual consistency that increase the scope of regression and visual analysis without increasing the amount of time it takes to perform.

The systems disclosed herein provide novel network systems, analytical software, and data structures that automatically consume images and associated metadata across any number of client devices on a network, identify relevant features and states, perform visual regression testing on features within a presentation layer, track historic changes to features and states, and automatically generate notifications based upon key performance indicators (KPIs) customized to each project or user.

The system includes a server-side application executing on one or more servers that stores configuration information (such as project specific configurations), consumes screenshots or images, identifies features and states, and performs visual regression analysis.

The clients and servers of the system can utilize Representational State Transfer (REST) software architecture. For example, the server can be a RESTful server. With the RESTful interface, the system allows for integration with automated development pipelines, such via as a CI (continuous integration) tool. When capturing new screenshots as part of a test, they can be sent to the system over REST to perform a comparison analysis, or any other custom analysis that had been configured as a plugin. With the ability to create an analysis job group, multiple analyses for a given CI job can be grouped for an in-depth review within the system's UI.

The system, though RESTful, can also include a web application interface to review and manage project feature catalog and the history of feature analysis runs. The web interface provides a UI to allow users to manage and review their projects, features, and analyses in a user-friendly way. Defining a feature and its states is as simple as filling out the relevant forms and uploading baseline images. Feature state analysis can be performed by starting a new analysis job and uploading a new image to compare it with. Each analysis for a feature state can be preserved for historical review. Users can also perform an ad-hoc, one-time comparison of two images, un-related to any project.

The system additionally includes a pluggable interface to perform various types of image analysis and visual regression, which can be customized to particular use cases, projects, features or states. This pluggable interface allows users to add custom analysis plugins that can be used to perform visual regression when analyzing a baseline and new image for a feature and state. As part of the custom plugin configuration, a developer can describe the dataset that is outputted by the custom plugin so that results and notifications can be configured for a project, feature, or feature state.

The system further includes novel data structures configured to link visual elements within a presentation layer to particular features and particular feature states and to index the evolution of features and features states over time. These data structures allow for granular and automatic tracking of disparate visual elements and their various states across the development lifecycle.

As discussed in greater detail below, the server-based system additionally includes automated notification functionality that can be configured to alert one or more client devices in the event of a visual feature or feature state deviating from a configured threshold. The notification functionality utilizes key performance indicators (KPIs) that are generated from the results of the visual regression analysis in order to determine whether to transmit notifications. The KPIs and KPI thresholds or expected values are user-configurable in order to allow each client or user to customize notifications on a per-project, per-feature, or per-feature state level.

FIG. 1 illustrates a flowchart for a method for maintaining visual consistency of the presentation layer of an application, according to an exemplary embodiment. The steps in the method can performed by one or more server-side computing devices communicatively coupled to one or more client-side computing devices. As used herein, "server-side" and "client-side" denote the server-client relationship between the two sets of devices involved in the method, and are not intended to be limiting. For example, a device that acts as a client-side device for the purposes of this method could also act as a server in a different context or for a different set of services. Additionally, the application can be any type of application, such as a web application.

At step 101 one or more images and associated metadata are received from one or more client-side computing devices. The associated metadata indicates a corresponding feature within the application and a corresponding state of that feature for each image in the one or more images. Note that the one or more images can be received in the context of a larger image, such as a screenshot which itself contains one or more images corresponding to multiple features.

The one or more images and associated metadata can be received via a RESTful interface, as discussed earlier. A user on a client-side computing device can also utilize a web based interface to communicate with the server-side computing device(s). In this case, the user interactions on the web based interface can be translated into the appropriate commands and metadata for communication with the RESTful server(s).

Figure 2:
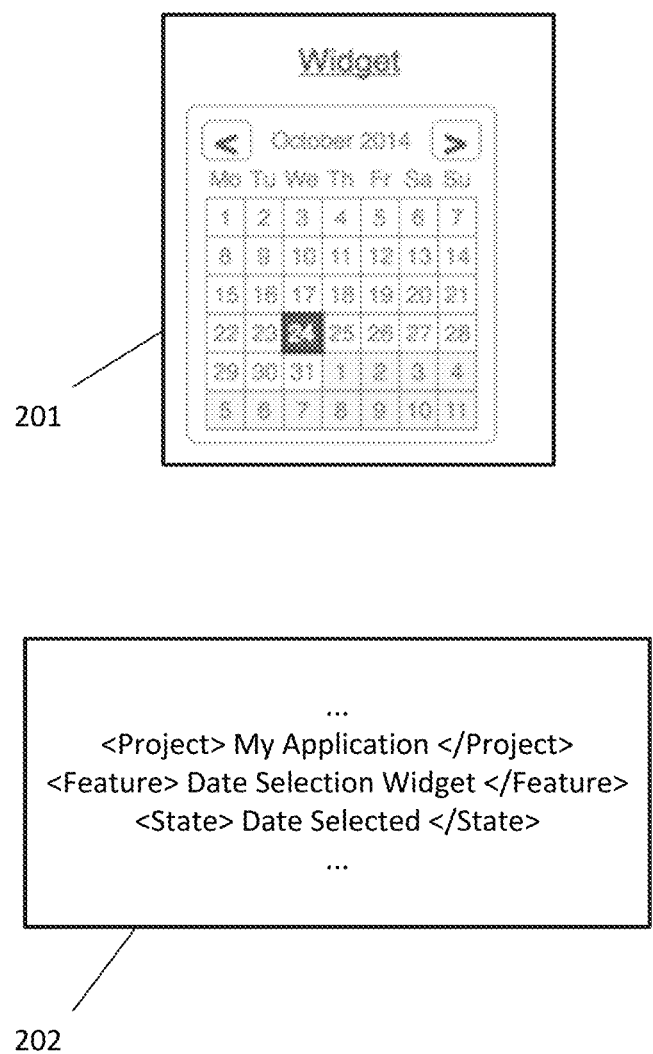
FIG. 2 illustrates an example of an image and associated metadata that can be received from a client-side computing device according to an exemplary embodiment.

FIG. 2 illustrates an example of an image 201 and associated metadata 202 that can be received from a client-side computing device according to an exemplary embodiment. In this example, the received image 201 corresponds to a date selection widget that allows a user to select a particular date in a calendar interface. As shown in FIG. 2, the associated metadata 202 can indicate a project name corresponding to this image ("My Application"), a feature name corresponding to this image ("Date Selection Widget"), and a feature state corresponding to this image ("Date Selected"). Of course, these fields are provided for illustration only and the associated metadata 202 can include more or less information. For example, the associated metadata 202 can omit the project name if the project information can be derived from previous messages or stored information. The associated metadata 202 can also specify configuration parameters, such as the type of visual regression analysis requested, whether the image should be set as a new baseline image, notification configurations, result format, etc. The associated metadata 202 can also specify whether the request is for synchronous processing (in which a task is processed and a result of the task is returned in response to the request) or asynchronous processing (in which the client can specify a grouping of tasks for processing and check on the status of tasks at a later time).

Figure 3:
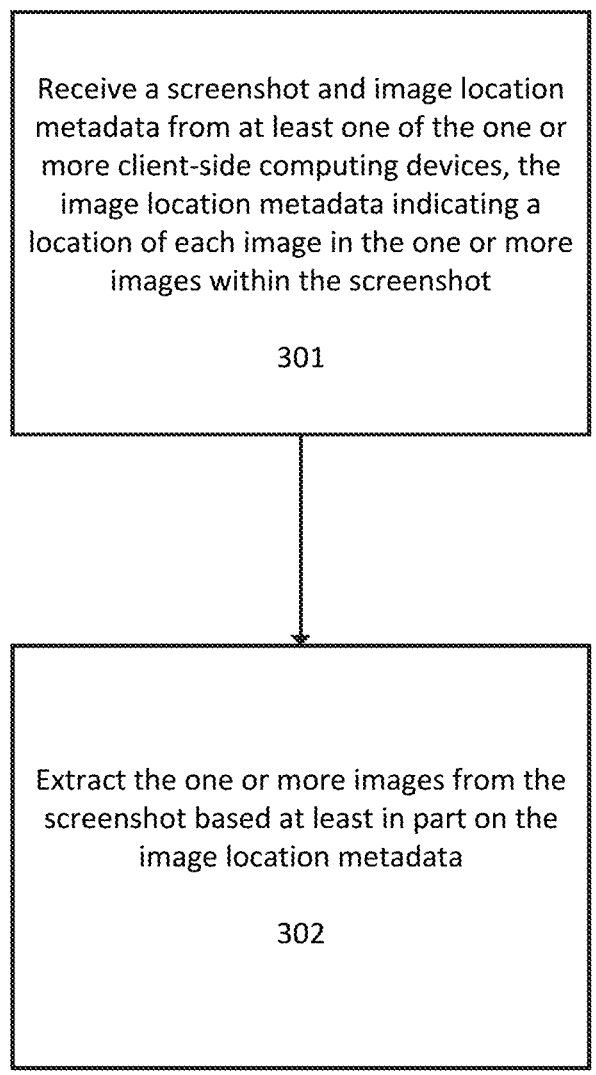
FIG. 3 illustrates a flowchart for receiving one or more images and associated metadata from one or more client-side computing devices when the one or more images are received as part of a larger image (such as a screenshot) according to an exemplary embodiment.

As discussed above, the one or more images can be received in the context of a larger image, such as a screenshot which itself contains one or more images corresponding to multiple features. FIG. 3 illustrates a flowchart for receiving one or more images and associated metadata from one or more client-side computing devices when the one or more images are received as part of a larger image (such as a screenshot) according to an exemplary embodiment.

At step 301 a screenshot and image location metadata are received from at least one of the one or more client-side computing devices. The image location metadata indicates a location of each image in the one or more images within the screenshot. For example, the image location metadata can be formatted in terms of X axis and Y axis screen coordinates. In this case, the image location metadata would have four sets of (X,Y) coordinates for a four-sided image, the coordinates defining the boundaries of the image within the larger screenshot. For other shapes, such as triangular images, three sets of coordinates would suffice. The shape of the image can also be specified as part of the image location metadata in order to aid with the subsequent extraction process, discussed below. Additionally, the image location metadata can include some combination of coordinates and dimensions. For example, the image location metadata can include a single coordinate and X and Y dimensions in some unit of measurement (such as pixels) that allows the image extractor to identify the relevant image within the larger image.

At step 302 the one or more images are extracted from the screenshot based at least in part on the image location metadata. A parser can be used to parse the metadata according to a set of rules and an image cropper or extractor can then be used to extract each image based upon the parsed metadata. For example, the parser can identify tags corresponding to coordinates, extract the relevant coordinates from the metadata, and then pass those coordinates to the extractor which can then crop out the relevant image.

Figure 4A:
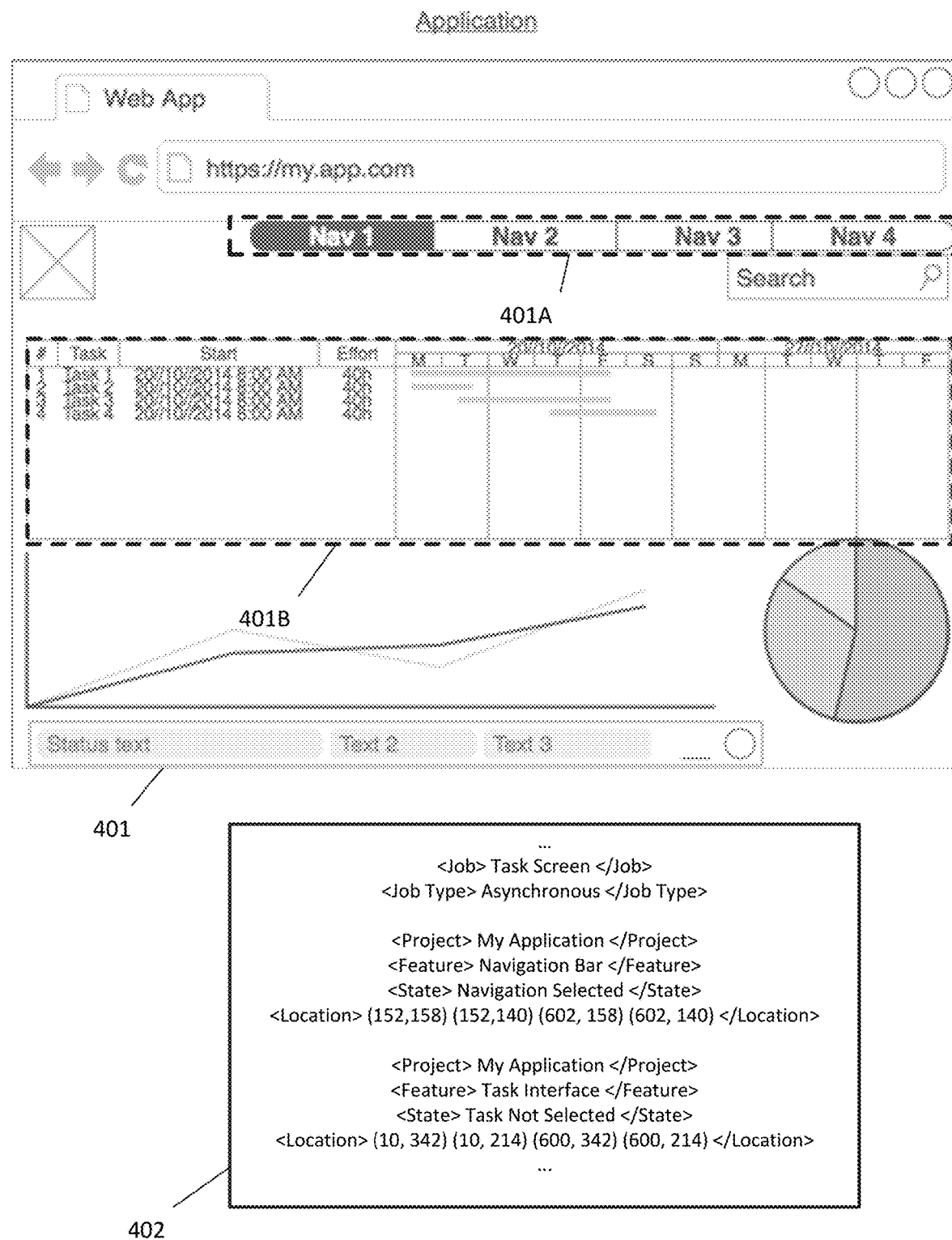
FIG. 4A illustrates an example of receiving a screenshot containing multiple images and the corresponding image location metadata according to an exemplary embodiment.

FIG. 4A illustrates an example of receiving a screenshot containing multiple images and the corresponding image location metadata according to an exemplary embodiment. As shown in FIG. 4A, the screenshot 401 contains multiple sub-images, including sub-image 401A and sub-image 401B. The associated metadata 402 includes information such as the relevant project, feature, and state for each sub-image, as well as metadata specifying that both sub-image 401A and sub-image 402A are to be processed asynchronously as part of a single job ("Task Screen"). The associated metadata 402 also includes image location metadata. In this case, the image location metadata specifies a set of four coordinates for each sub-image. These four coordinates are used by the image extractor to extract each of the sub-images.

Figure 4B:
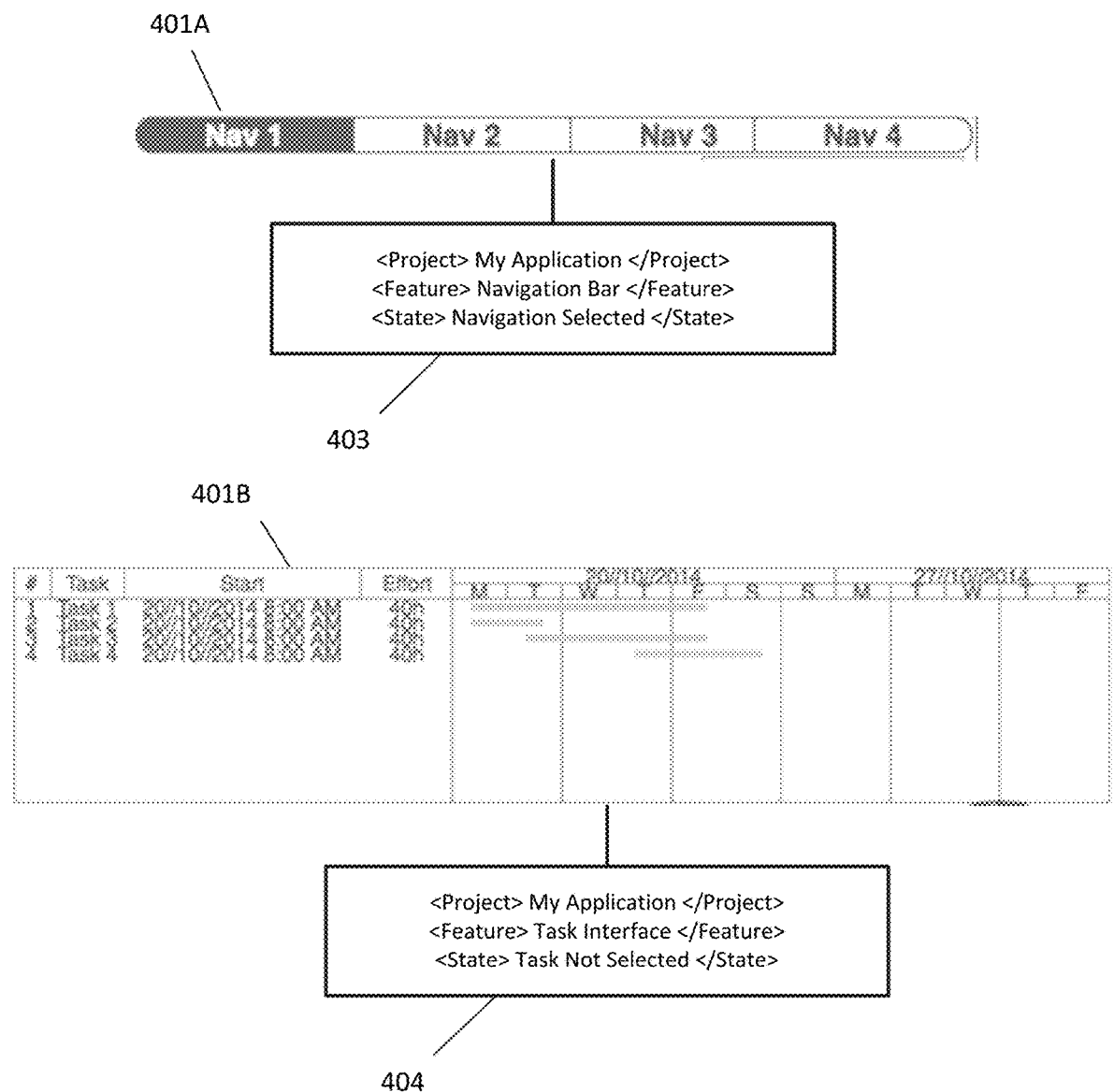
FIG. 4B illustrates the images extracted from the screenshot and associated metadata according to an exemplary embodiment.

FIG. 4B illustrates the images extracted from the screenshot and associated metadata according to an exemplary embodiment. As shown in FIG. 4B, sub-image 401A is extracted and associated with a relevant portion of metadata 403 and sub-image 401B is extracted and associated with a relevant portion of metadata 404. This linking of the extracted images with the corresponding metadata can be based upon the formatting of the metadata and the parsing of the metadata. For example, as shown in the associated metadata 402 of FIG. 4A, the project, feature, and state information for each sub-image is grouped together with the image location metadata for that sub-image. This grouping can be used by the parser and/or image extractor to subsequent associate or link within memory each extracted sub-image and the corresponding metadata.

Returning to FIG. 1, at optional step 102 each of the one or more images (whether received as separate images or extracted from a larger image, such as a screenshot), can then be persisted to a server-side memory. Each of images can be associated with the corresponding particular project, feature, and/or state within memory. For example, the memory system can be indexed or otherwise organized along the basis of projects, features within projects, and states within features. In this case, each image would be stored at the appropriate location within the memory system that corresponds to its project, feature, and state. Alternatively, the corresponding project, feature, and state for each stored image can be stored in a lookup table or other data structure. For example, a table having four columns could include a column for each image identifier or handle (which can be a dynamically assigned identifier or which can be a pointer or link to a location of the image within memory), a column for the relevant project, a column for the relevant feature, and a column for the relevant state.

Each image can also be stored with additional metadata, such as timestamp, which allows for version tracking of all iterations of a particular feature and state. Timestamps can be used to determine the organization of various images corresponding to multiple iterations of a feature and state. For example, all images corresponding to a particular feature and state can be stored within memory in chronological order (such as in a stack) to allow for faster retrieval of the latest version.

The determination of whether to persist of each image in the one or more images to a server-side memory can be based upon the particular user/client configuration, including project settings, feature settings, and state settings. For example, the user/client may wish to automatically save all versions of a particular feature but not to save all versions of a different feature.

The determination of whether to persist of each image in the one or more images to a server-side memory can additionally or alternatively be based upon the type of processing that is requested or set in the configurations for the project/feature/state. For example, if the client device has indicated asynchronous processing, then the received images can automatically be persisted so that the server side computing device(s) can schedule and complete the requested processing at the appropriate time. Alternatively, if the client device has indicated synchronous processing and has also indicated that new images which do not meet certain requirements (such as passing certain visual regression requirements) should not be automatically saved, then the step of persisting each received image would not take place until the visual regression analysis is complete and the requirements have been met.

The determination of whether to persist each image can also be made based upon job size. For example, if a user submits a large job, having dozens of images, then it can automatically be designated for asynchronous processing, since the completion time would be lengthy. In this case, each of the images would be persisted to the server-side memory for subsequent analysis. The threshold for what qualifies as a large job can be set by the user or automatically determined based upon, for example, available computing resources available and estimated computing resources required to complete the job. The threshold can be set in terms of number of images, time required to complete the job, size of images, complexity of analysis, etc.

At optional step 103 one or more analysis identifiers corresponding to the one or more images are transmitted to at least one of the one or more client-side computing devices. The analysis identifiers can be assigned dynamically by the system to each visual regression analysis task. For example, if three images were received corresponding to three sets of feature/states, then three analysis identifiers would be generated and transmitting to at least one of the one or more client-side computing devices. Step 103 is performed when asynchronous processing is selected, whether as part of the request (e.g., a command or tag within the metadata), as part of the user selected settings or configuration for a project/feature/state, or as an automatic determination based upon job size.

As will be discussed in greater detail below, the analysis identifiers can then be utilized by the client-side device(s) to poll the server-side device(s) for status updates regarding each visual regression analysis task. The analysis identifiers can optionally include information allowing the client-side device(s) to determine which analysis identifier corresponds to which image/feature/state set. For example, the analysis identifier can be sent with a message specifying the correspondence or the analysis identifier itself can incorporate the feature/state names.

At step 104 a baseline image corresponding to each image in the one or more images is retrieved from a server-side memory based on the corresponding feature and the corresponding state for each image. By default, the system can retrieve the most recent baseline image, but the client/user can configure the system to retrieve any baseline image in the feature's history.

Figure 5:
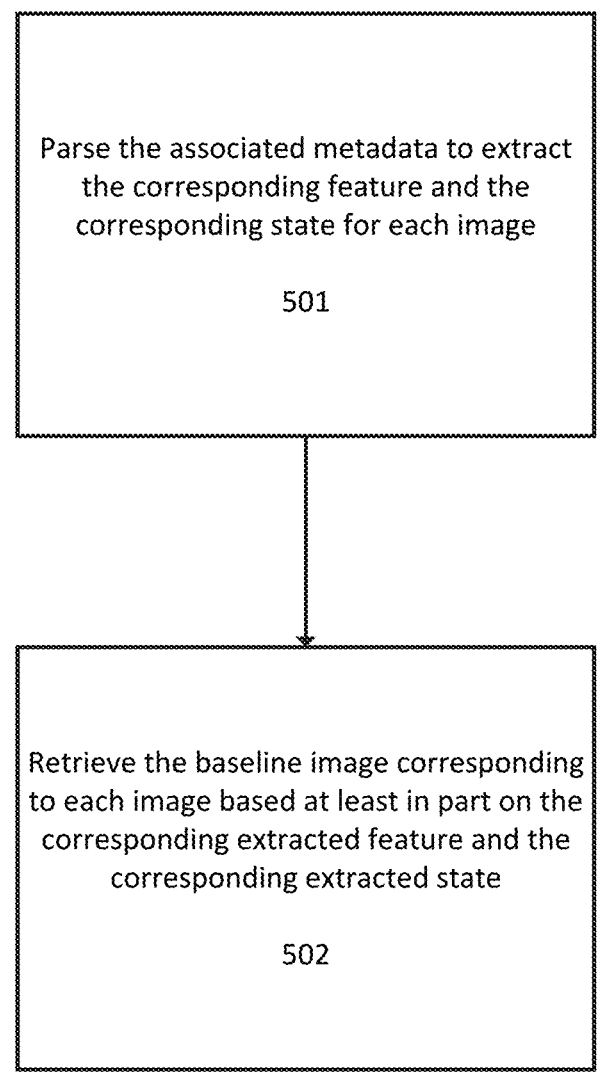
FIG. 5 illustrates a flowchart for retrieving a baseline image corresponding to each image in the one or more images from a server-side memory based on the corresponding feature and the corresponding state for each image according to an exemplary embodiment.

FIG. 5 illustrates a flowchart for retrieving a baseline image corresponding to each image in the one or more images from a server-side memory based on the corresponding feature and the corresponding state for each image according to an exemplary embodiment.

At step 501 the associated metadata is parsed to extract the corresponding feature and the corresponding state for each image. If the project is not known, the metadata can be parsed to extract project information as well. As discussed earlier, this parsing can be performed by a parser (e.g., a lexical analyzer) and can involve identification of tags or identifiers corresponding to various feature names and feature states.

At step 502 the baseline image corresponding to each image is retrieved based at least in part on the corresponding extracted feature and the corresponding extracted state. The implementation of this step can vary depending upon how the server-side memory is organized and indexed but involves a lookup process that takes the feature and feature state as input and returns either the corresponding baseline image or a memory location of the corresponding baseline image that is then used to retrieve the baseline image.

Initial baseline images and associated features and feature states are configured prior to submission of subsequent images for visual regression analysis. In the disclosed system, users create projects corresponding to particular presentation layers. Within a project, users can create a feature, which corresponds to some visual entity the user wishes to track. Once a feature is created, a user uploads a baseline image to represent the initial presentation of the feature in a default state.

The present system utilizes data structures that allow for multiple representations of different states of a particular feature. For example, a text input widget could display a warning or error state that changes the color of the input field border during input validation. In another example, a widget or application screen may need to be tested in a responsive manner and have screenshots taken at various resolution breakpoints to ensure the experience works as expected. When creating a new feature, users can add states to the feature and add baseline images for each state. This solution allows one to organize and track changes for each state a feature may have.

Once initial baseline images have been persisted to the server-side computing device(s) for particular features and feature states, any subsequent images corresponding to those features and feature states can be used to update the baseline image or to store multiple different baseline images according to the date and time of receipt. A user or client can configure when and how they would like subsequent images to be stored and whether the subsequent images should be stored as new baseline images or updated baseline images. For example, a user can specify that any subsequent images that do not result in any visual regression analysis warnings or alerts should automatically be stored as new baseline images or updated baseline images. Alternatively, a user can explicitly indicate that a subsequently submitted image should replace an earlier submitted baseline image or be added as a new baseline image even when no visual regression analysis is performed.

The initial baseline images and any subsequent baseline images are also transmitted to the server-side computing device(s) via a RESTful interface. As discussed earlier, this user-facing portion of this interface can include a web based application that allows for user-friendly uploading of images and commands. The RESTful interface can also be utilized by software on the client-side computing device(s), such as continuous integration (CI) development tools, to send messages and images to the RESTful server(s).

Figure 6:
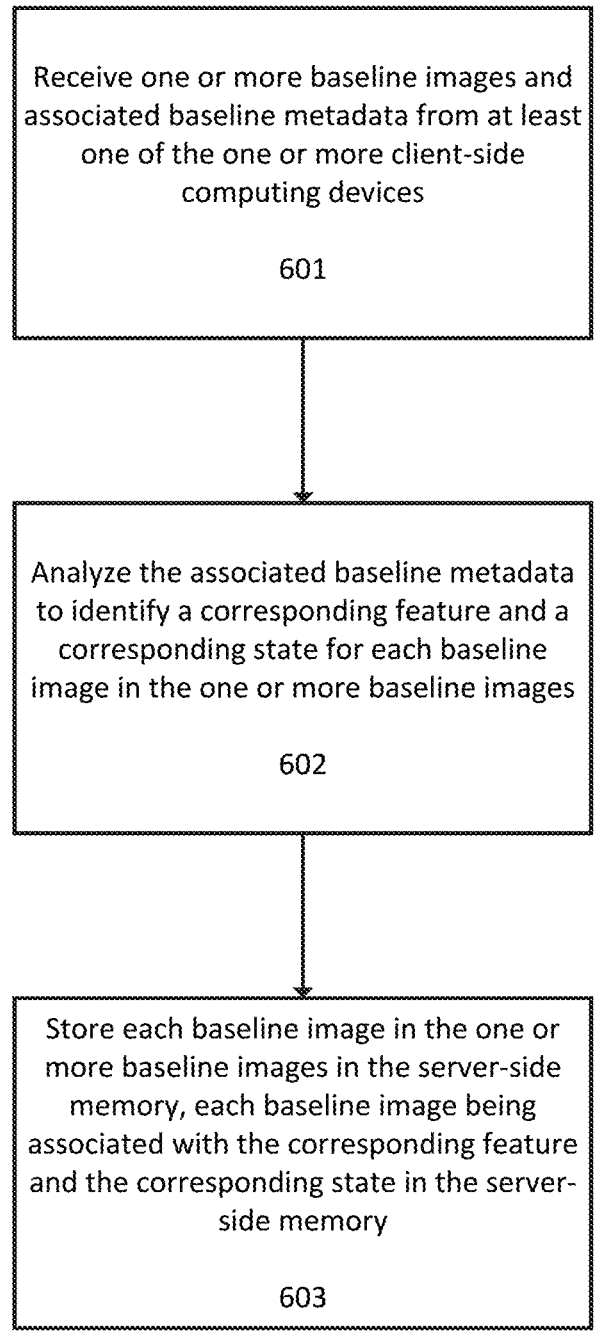
FIG. 6 illustrates a flowchart for receiving and storing baseline images according to an exemplary embodiment.

FIG. 6 illustrates a flowchart for receiving and storing baseline images according to an exemplary embodiment. At step 601 one or more baseline images and associated baseline metadata are received by the server-side computing device(s) from at least one of the one or more client-side computing devices. As discussed above, these images can be uploaded via a web based interface and user inputs to the web based interface (regarding, for example, the corresponding feature and feature state) can be converted into metadata for parsing by the system. The images and metadata can also be provided to a RESTful interface of the server-side computing devices by a program running on the client-side computing device, such as a CI tool.

At step 602 the associated baseline metadata is analyzed to identify a corresponding feature and a corresponding state for each baseline image in the one or more baseline images. This can include parsing the metadata, as discussed above, and can also include creation of new objects or records corresponding to any new features and states specified in the metadata.

At step 603 each baseline image in the one or more baseline images is stored in the server-side memory, each baseline image being associated with the corresponding feature and the corresponding state in the server-side memory. Each of the baseline images can be associated with the corresponding particular project, feature, and/or state within memory. For example, the memory system can be indexed or otherwise organized along the basis of projects, features within projects, and states within features. In this case, each baseline image would be stored at the appropriate location within the memory system that corresponds to its project, feature, and state. Alternatively, the corresponding project, feature, and state for each stored baseline image can be stored in a lookup table or other data structure. For example, a table having four columns could include a column for each baseline image identifier or handle (which can be a dynamically assigned identifier or which can be a pointer or link to a location of the image within memory), a column for the relevant project, a column for the relevant feature, and a column for the relevant state.

Each baseline image can also be stored with additional metadata, such as timestamp, which allows for version tracking of all baseline iterations of a particular feature and state. Timestamps can be used to determine the organization of various baseline images corresponding to multiple iterations of a feature and state. For example, all baseline images corresponding to a particular feature and state can be stored within memory in chronological order (such as in a stack) to allow for faster retrieval of the latest version.

Figure 7:
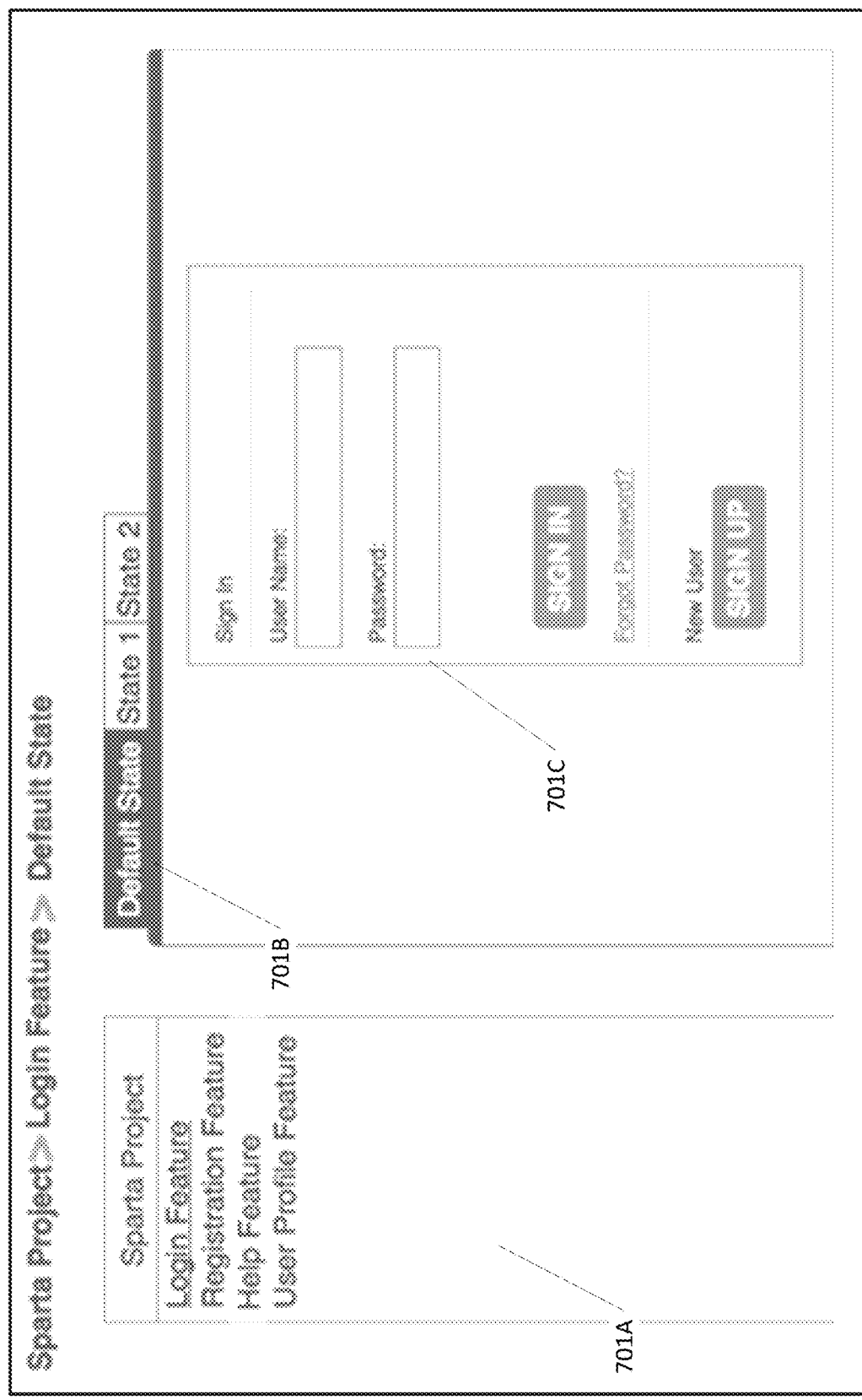
FIG. 7 illustrates a web based application interface for receiving or reviewing images or baseline images and setting corresponding features and states according to an exemplary embodiment.

FIG. 7 illustrates a web based application interface for receiving or reviewing images or baseline images and setting corresponding features and states according to an exemplary embodiment. As shown in FIG. 7, interface 701 includes a features sub-interface 701A that allows users to select between different features in a particular project. Interface 701 also includes a state sub-interface 701B that allows users to select between different states of a particular features. In the example shown in FIG. 7, baseline image 701C corresponds to the "Default" state of the "Login" feature.

Returning to FIG. 1, at step 105 a visual regression analysis is performed between each image in the one or more images and the corresponding baseline image to determine one or more values of one or more indicators. The type of visual regression analysis and the specific indicators for which values are determined can be customized based upon user configurable settings, the particular feature being analyzed, the state being analyzed, the project, and/or the type of image or characteristics of the image.

Figure 8:
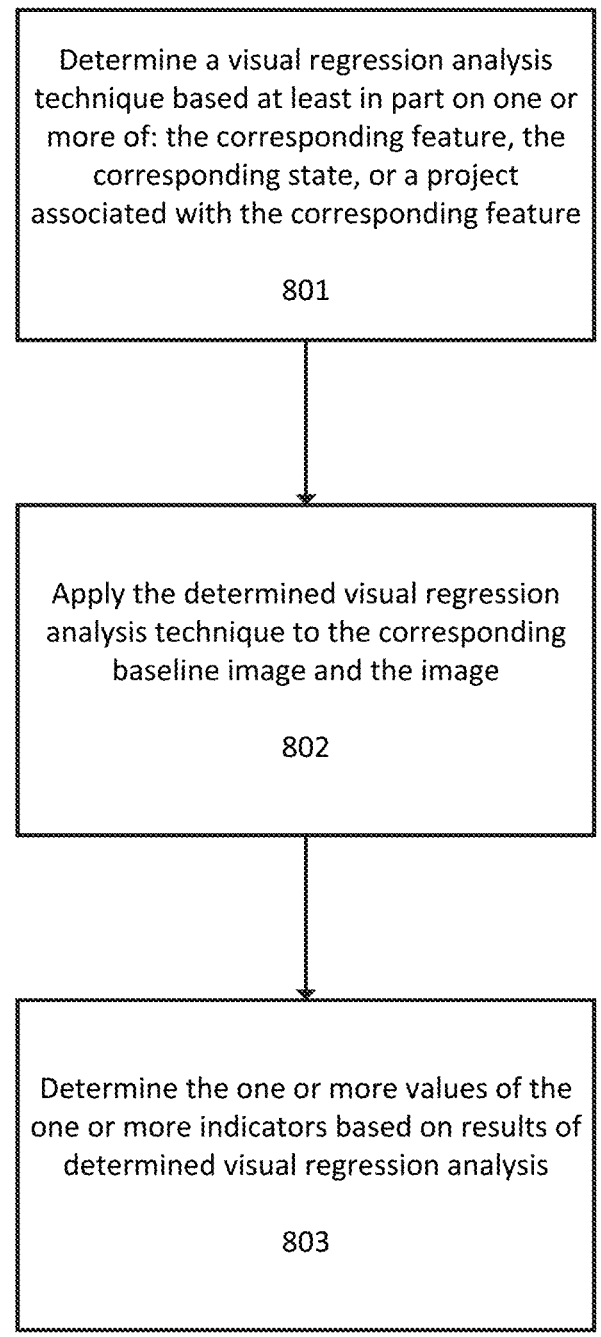
FIG. 8 illustrates a flowchart for performing a visual regression analysis between each image in the one or more images and the corresponding baseline image to determine one or more values of one or more indicators according to an exemplary embodiment.

FIG. 8 illustrates a flowchart for performing a visual regression analysis between each image in the one or more images and the corresponding baseline image to determine one or more values of one or more indicators according to an exemplary embodiment.

At step 801 a visual regression analysis technique is determined based at least in part on one or more of: the corresponding feature, the corresponding state, or a project associated with the corresponding feature. The determined technique can be selected from a variety of visual regression analysis techniques, including a pixel differential analysis, a color palette analysis, or one or more user-defined or user-uploaded analysis techniques. For example, a user may create custom analysis techniques target to particular feature or state for analysis. The determination of a visual regression analysis technique for a particular image and baseline image can be based on user settings or default values associated with the corresponding feature, the corresponding state, or the particular project. For example, the user may specify that certain widgets are analyzed using pixel differential analysis but that multiple feature sets corresponding to a particular functional slice are analyzed using color palette analysis.

At step 802 the determined visual regression analysis technique is applied to the corresponding baseline image and the image to generate a result. The result can take different forms based upon the type of regression analysis being performed. For a pixel differential analysis, the result can be an image showing the pixels that are different between the baseline image and a subsequent image of the feature state. For a color palette analysis, the result can be a comparison of the colors in the baseline image and the subsequent image and/or a list of colors that do not match or are not the expected values.

Figure 9:
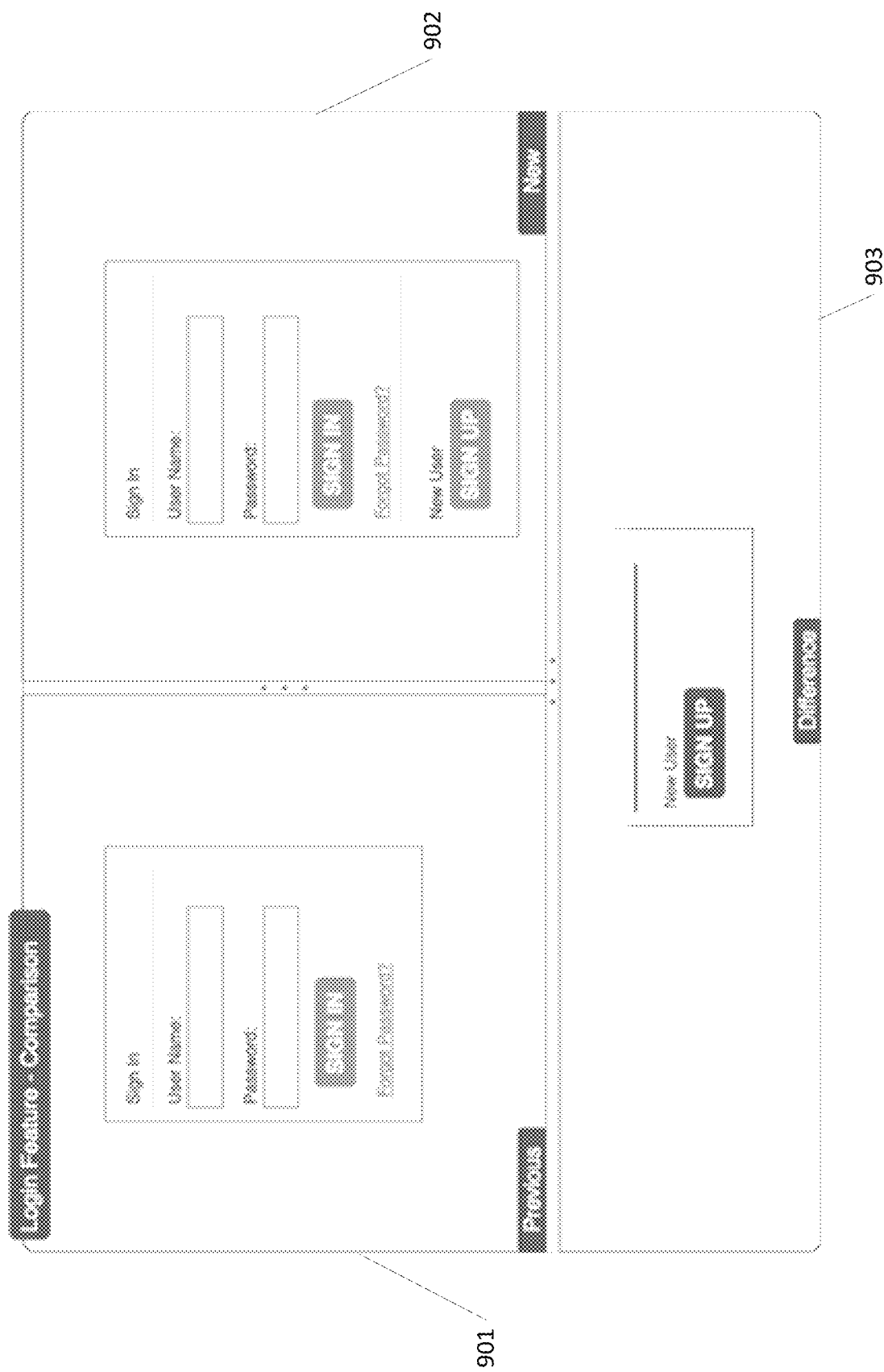
FIG. 9 illustrates the results of a pixel differential analysis according to an exemplary embodiment.

FIG. 9 illustrates the results of a pixel differential analysis according to an exemplary embodiment. As shown in FIG. 9, the baseline image 901 is compared with a subsequent new image 901 and the difference between the two images is shown as a separate image 903. After a feature analysis is complete, users may log into the system to review that analysis. Navigating to the feature analysis results page, users can view the baselines and uploaded screenshot separately, as well as view any analysis results, such as a pixel comparison of the two images. In FIG. 9, a "diff" image is created to highlight exactly what has changed.

Returning to FIG. 8, at step 803 the one or more values of the one or more indicators are determined based on results of the determined visual regression analysis. The one or more indicators for which values are determined can be based upon the type of visual regression analysis performed and/or user settings specifying which indicators they would like to utilize. For example, when utilizing pixel differential analysis, a user can specify that they would like to utilize a "percentage pixel difference" indicator. The values of the one or more indicators can also be determined automatically as part of applying the determined visual regression analysis technique. For example, a color palette analysis can automatically produce a value for an indicator that represents the number of colors in a subsequent image that are not present in the baseline image.

Referring to FIG. 1, at step 106 one or more alerts are transmitted to at least one of the one or more client-side computing devices based at least in part on a determination that at least one value of at least one indicator is outside of a predetermined range of values or does not match an expected value of the at least one indicator. This process is explained in further detail with respect to FIG. 10. Optionally, step 106 can be omitted if all indicator values fall within the predetermined range of values, if all indicator values match expected values or ranges, and/or if the user or client does wish to receive alerts and has configured their settings to not receive any alerts. In the latter case, the results of all analysis, as well as any indicator values, can be stored on the server-side memory for later review or retrieval by a user from a client-side device.

Figure 10:
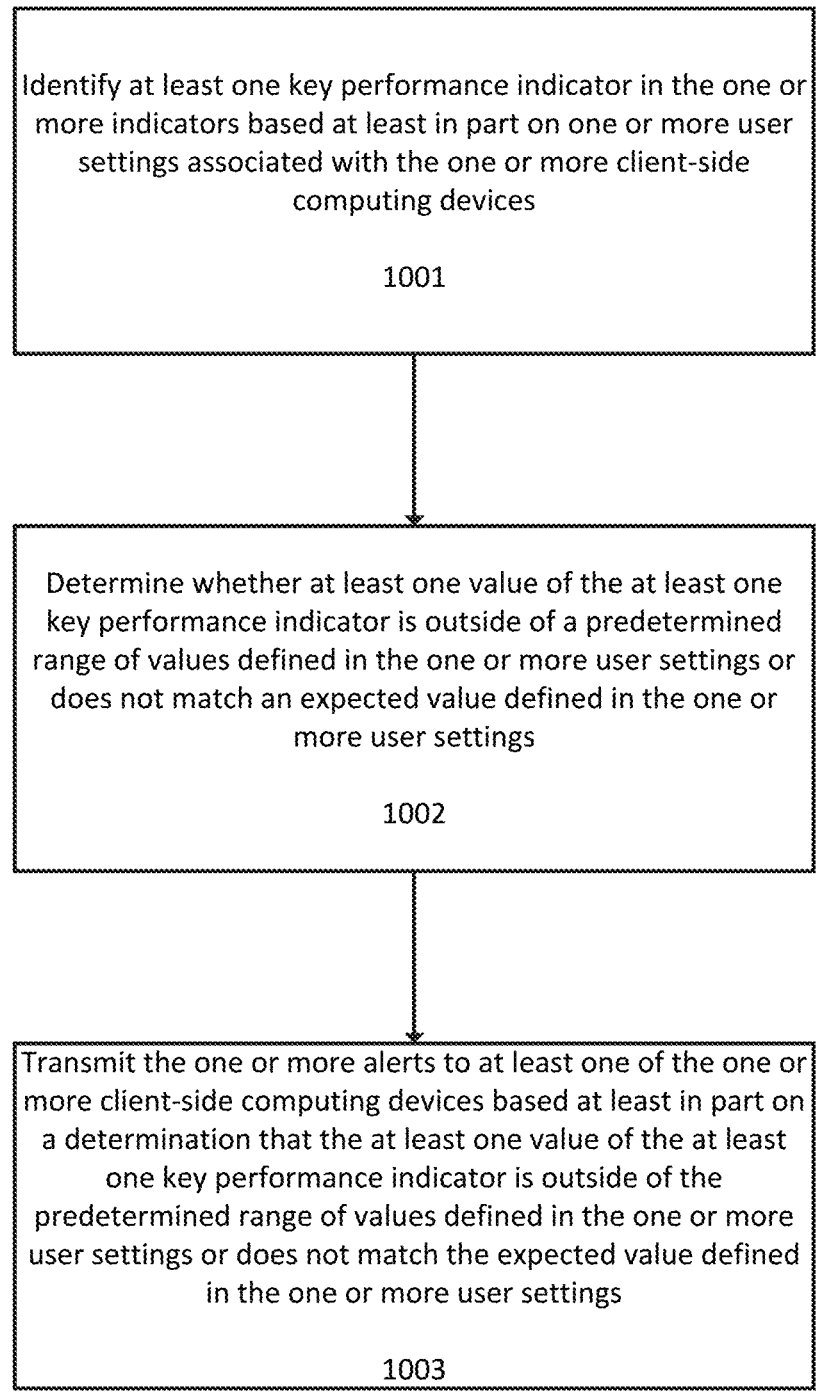
FIG. 10 illustrates a flowchart for transmitting one or more alerts to at least one of the one or more client-side computing devices based at least in part on a determination that at least one value of at least one indicator is outside of a predetermined range of values or does not match an expected value of the at least one indicator according to an exemplary embodiment.

FIG. 10 illustrates a flowchart for transmitting one or more alerts to at least one of the one or more client-side computing devices based at least in part on a determination that at least one value of at least one indicator is outside of a predetermined range of values or does not match an expected value of the at least one indicator according to an exemplary embodiment.

At step 1001 at least one key performance indicator ("KPI") in the one or more indicators is identified based at least in part on one or more user settings associated with the one or more client-side computing devices.

Depending on the level of granularity one wishes to track, a large application may result in hundreds, if not thousands of features and states to track. Even with an automated visual analysis system, it can become unmanageable to manually review the results for each feature and their states after a project-wide analysis.

In one example use case, in a style guide library that is shared across multiple products in a company's portfolio, one may wish to be alerted immediately if any changes to the style guide results in even the smallest change to a features visual representation. When evaluating a foundational UI element, a user of the system may wish to be alerted if the percentage of pixel difference is more than 0%. This is because a foundational UI element may cause major downstream visual changes to projects that consume the element.

Therefore, the system allows a user to configure alerts based on key performance indicators (KPIs), or thresholds, for any target feature state. The user may configure the system to notify them or others via email, text, or any other messaging format, if that threshold is breached. These notifications lead to quicker visibility of possible visual issues and allows for a much faster resolution.

At step 1001, the one or more indicators can be evaluated to determine whether they contain any KPIs, as defined by user(s) on the client-side device(s). For example, the system can perform a lookup of an account/user/client/project/feature/state identifier and retrieve a list of all relevant KPIs and then compare the retrieved KPIs to the one or more indicators resulting from the performance of the visual regression analysis if any of the one or more indicators are KPIs.

At step 1002 it is determined whether at least one value of the at least one key performance indicator is outside of a predetermined range of values defined in the one or more user settings or does not match an expected value defined in the one or more user settings. The predetermined range of values can correspond to a range of acceptable values and can be defined using a combination of a threshold and a direction of measurement/evaluation.

The predetermined range of values and expected values of each KPI can initially be set to default values in the user settings and can be edited by user(s) according to their particular needs. For example, the default pixel difference threshold for a pixel difference indicator can be initially set to 20 percent (corresponding to an acceptable range of 0-20 percent) and then subsequently edited by a user to apply a 5 percent threshold instead (corresponding to an acceptable range of 0-5 percent) for a specified set of projects, features, and/or states.

Additionally, as used herein a value of KPI can be considered to be "outside of" a predetermined range when it is either above or below a particular threshold, depending on the type of KPI being evaluated and the user configuration for that KPI. For example, for a KPI corresponding to pixel difference percentage, a value that is greater than predefined pixel difference percentage threshold can be considered to be "outside of" the threshold (and therefore outside of the range from 0-pixel difference percentage threshold). Alternatively, for a KPI that measured pixel similarity percentage, a value that is less than a predefined pixel similarity percentage can be considered to "outside of" threshold (and therefore outside of the range from the pixel similarity percentage threshold-100).

In the case of pixel difference percentage, the user can define threshold as, for example, 10 percent, and indicate that any values above this 10 percent threshold (in the range of 10-100) should be flagged. Alternatively, in the case of pixel similarity, the user can define the threshold as, for example, 90 percent, and indicate that any values below this 90 percent threshold (in the range of 0-90) should be flagged. In this sense, the predefined threshold defines a range of acceptable values of the KPI (the range being either above or below some initial baseline value).

Step 1002 can also include evaluating whether a value of a KPI does not match an expected value defined in the one or more user settings. This evaluation is useful for KPIs that have values expressed in terms of sets (such as the set of colors in a color palette) or in terms of Boolean (true or false) values. For example, the user may configure their settings so that the color palette of a subsequent image must exactly match the color palette of a baseline image (or some color palette associated with the project or set of features). In this case, the KPI can have a value that is a list of all colors present in the subsequent image that are not present in the baseline image, a list of all colors present in the baseline image that are not present in the subsequent image, or some combination of the two. The KPI can also have a Boolean value, colorsMatch, which is true when all colors match and false otherwise. In these situations, the value of the KPI can be compared with the "expected value" (which is the desired value required for conformity, as configured by a user) to determine whether the actual value matches the expected value.

At step 1003 one or more alerts are transmitted to at least one of the one or more client-side computing devices based at least in part on a determination that the at least one value of the at least one key performance indicator is outside of the predetermined range of values defined in the one or more user settings or does not match the expected value defined in the one or more user settings. As discussed earlier, alerts can be transmitted via email, text message, server-client communications, or via any other communications program or medium.

If an analysis job group is being leveraged to group multiple analysis requests, the job group itself can collect all breached KPIs and dispatch a single summary notification with information about all of the thresholds breached.

When leveraging the system's REST Application Programming Interfaces (APIs), the system can, in its response payload, include any information about KPIs being breached. This is helpful when running automated analysis as part of a CI pipeline. The CI pipeline logic can inspect any breached KPIs and respond appropriately.

Returning to FIG. 1, at optional step 107, results of the visual regression analysis between each image in the one or more images and the corresponding baseline image are stored on the server-side memory. This can include, for example, storing the values of any indicators determined as part of the visual regression analysis and/or storing any images resulting from the visual regression analysis (such as diff image 903 in FIG. 9). A user can then access, browse, or download these results via web interface hosted on the server-side computing device(s) and accessible from the client-side computing device(s). When RESTful server(s) are utilized, a user can also request or retrieve these results by polling or querying the RESTful server(s) from the client-side computing device(s).

Figure 11:
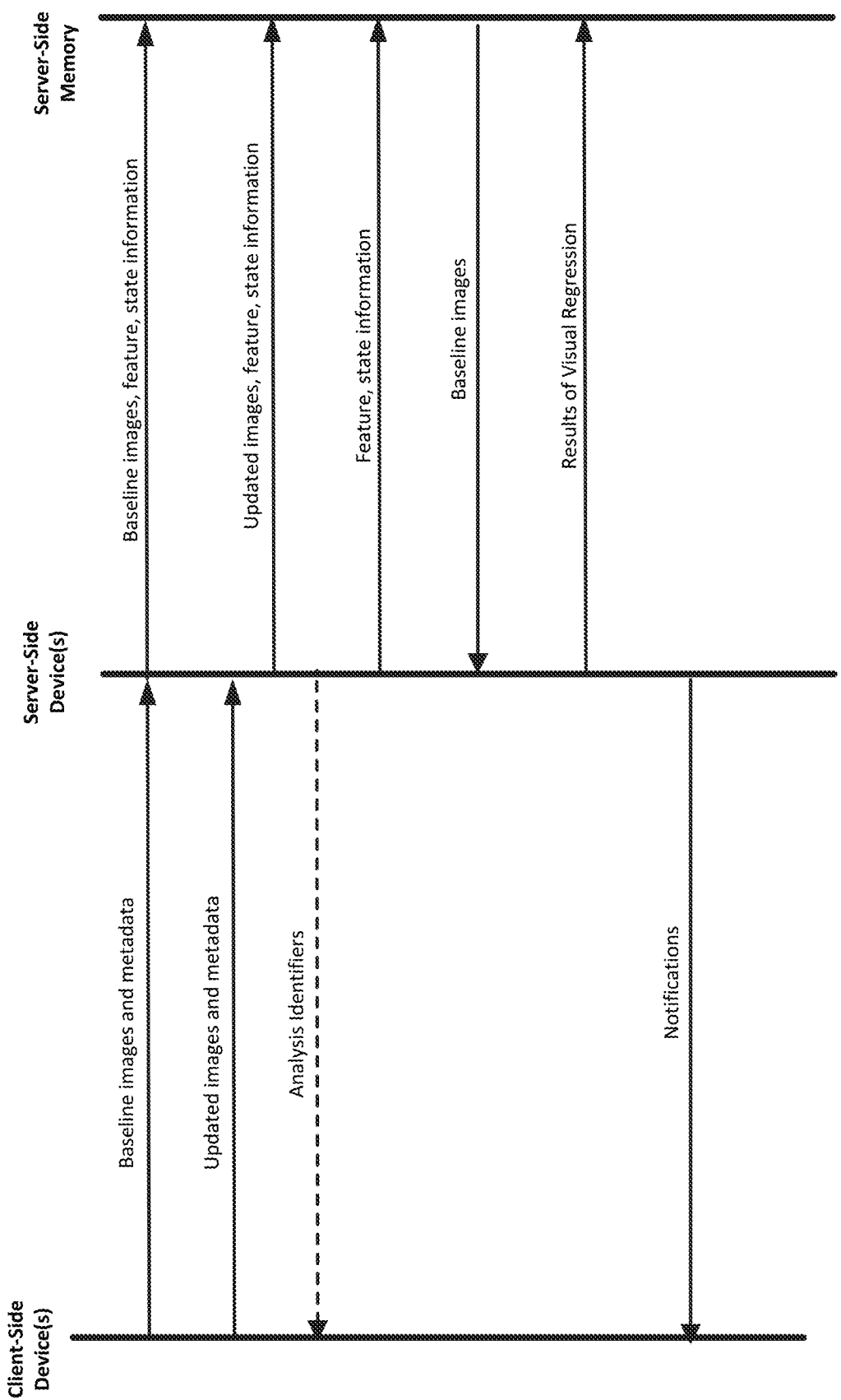
FIG. 11 illustrates an example of a message passing diagram between a client-side device(s), server-side device(s), and server-side memory according to an exemplary embodiment.

FIG. 11 illustrates an example of a message passing diagram between a client-side device(s), server-side device(s), and server-side memory according to an exemplary embodiment. As shown in FIG. 11, baseline images and associated metadata are first sent from a client-side device to the server-side device. As discussed earlier, the baseline images and associated metadata can be received from the client-side via a web application hosted on the server device or can be transmitted by a CI process executing on the client-side device.

The server-side device then extracts the relevant images (if necessary), parses the metadata (if necessary), and associates each baseline image with relevant feature and state information, as well any additional information required for storage, such as, for example, project information, client information or identifier, etc. The server-side device then sends the baseline images and feature and state information to server-side memory, where each baseline image is stored in association with the corresponding feature and state.

Updating a feature with its latest baseline can be achieved in multiple ways. A screenshot uploaded via REST can represent a single feature state, or multiple features and their states. When using a single screenshot to represent multiple features, as part of the feature update request, a client-side device can pass along multiple sets of x/y coordinates and dimensions to represent each of the features they wish to track. When the server receives the request, the system will crop out each of the image slices from the original screenshot and persist the corresponding feature's information with the latest image.

At some later point in time, updated images and metadata are sent from the client-side device to the server-side device. Once again, the server-side device performs the necessary processing and sends the updated images for storage in the server-side memory in association with the corresponding feature and state information. Optionally, the server-side device can postpone storage of the updated images if the user settings indicate that updated images should not be stored unless they meet requirements of visual regression analysis. In this case, the server-side device could conduct and evaluate the result of visual regression analysis to ensure that all KPIs meet user requirements prior to storage.

Analyses can be performed synchronously or asynchronously. When performing a synchronous analysis request, the server-side system will perform the configured analysis and return the result as soon as the analysis is complete. If any KPIs are configured, the system can respond with data describing any KPI threshold breach. This is useful for CI jobs in which the job is configured to fail or warn in the event of a KPI threshold breach. When performing an asynchronous analysis request, the response can return after the new image is persisted to the system, allowing image analysis to occur independently. In this case, the analysis ID can be returned, allowing the client-side device to poll the REST API until the job is complete. Asynchronous analysis is helpful when there is a large number of feature states to analyze.

Turning to FIG. 11, in the event of asynchronous analysis, the server-side device can generate analysis identifiers corresponding to each of the updated images after the updated images have been persisted to server-side memory. These analysis identifiers can then be sent to the client-side device, as shown by the dashed arrow. The client-side device can then utilize the analysis identifiers to poll the server-side device for updates regarding the status of the visual regression analysis for each of the updated images.

Regardless of whether the analysis is synchronous or asynchronous, the server-side device retrieves the baseline images corresponding to the updated images from the server-side memory using the corresponding feature and state information. The server-side device then performs the visual regression analysis as discussed above and sends the results of the visual regression to server-side memory. Once the analysis is complete, a user can review the changes in the system's web application interface. The server-side device also sends any notifications based upon KPIs to the client-side device.

By default, the system can compare the uploaded screenshot to the most recent baseline screenshot, but users can configure the system to compare to any baseline screenshot in the feature's history or an updated image can be sent with a command or parameter that specifies which baseline image should be used.

Of course, the actual messages passed between the components shown in FIG. 11 could vary in content or order. For example, the server-side device could concurrently sends notifications to the client-side device and results of the visual regression to the server-side memory. Alternatively, the server-side device can omit the step of sending results to the server-side memory if the results of the visual regression do not meet user KPIs or other requirements. Additionally, if the client-side device submits a job having multiple images, any notifications can be transmitted after all visual regression analyses are complete, or on a rolling basis.

Figure 12:
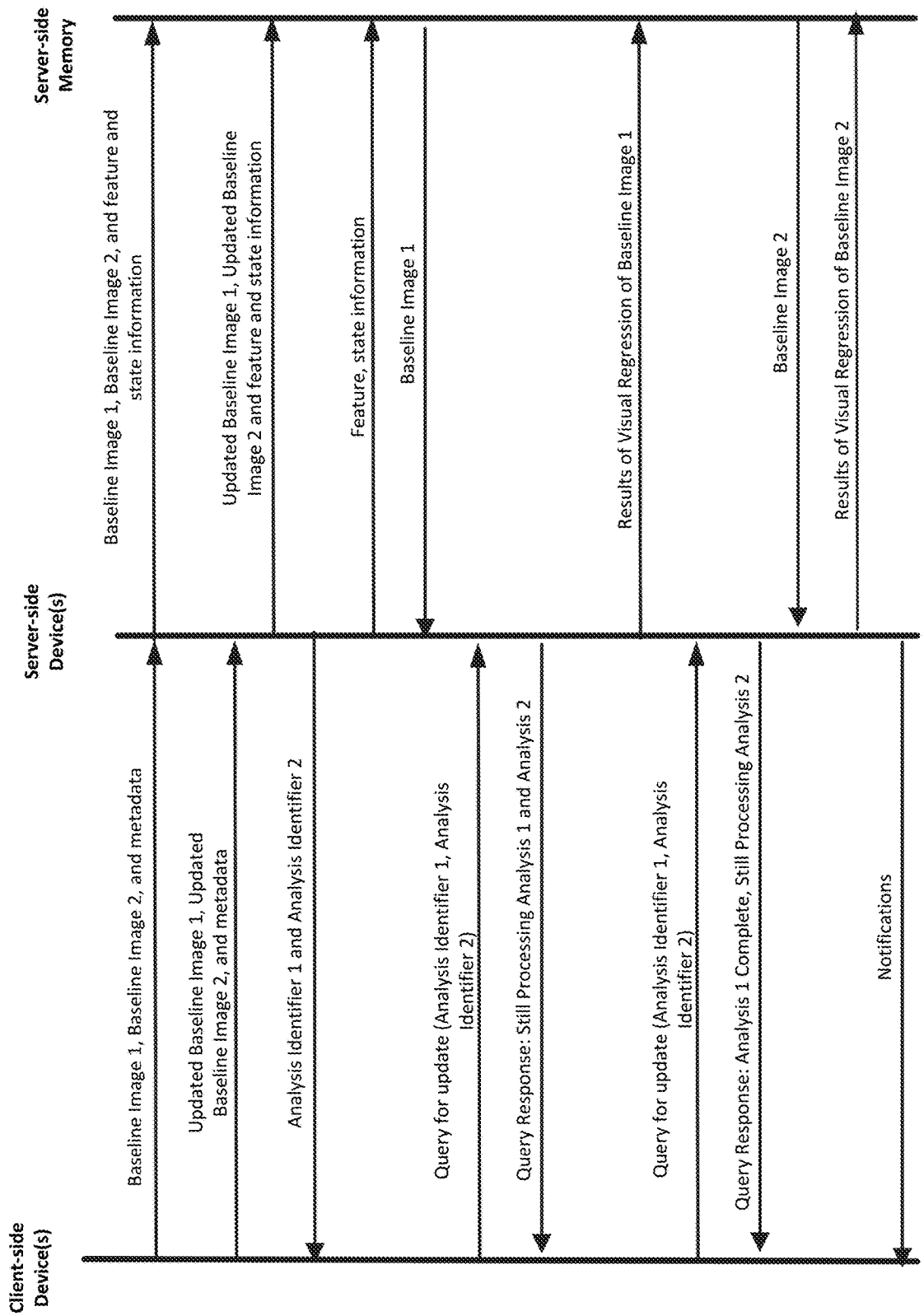
FIG. 12 illustrates another example of a message passing diagram between a client-side device(s), server-side device(s), and server-side memory according to an exemplary embodiment.

FIG. 12 illustrates another example of a message passing diagram between a client-side device(s), server-side device(s), and server-side memory according to an exemplary embodiment. FIG. 12 is similar to FIG. 1, but assumes that asynchronous analysis is performed. As shown in FIG. 12, once analysis identifiers are sent from the server-side device to the client-side device, the client-side device can poll the server-side device for updates to particular analyses and the server-side device can respond with the status of each analysis.

Figure 13:
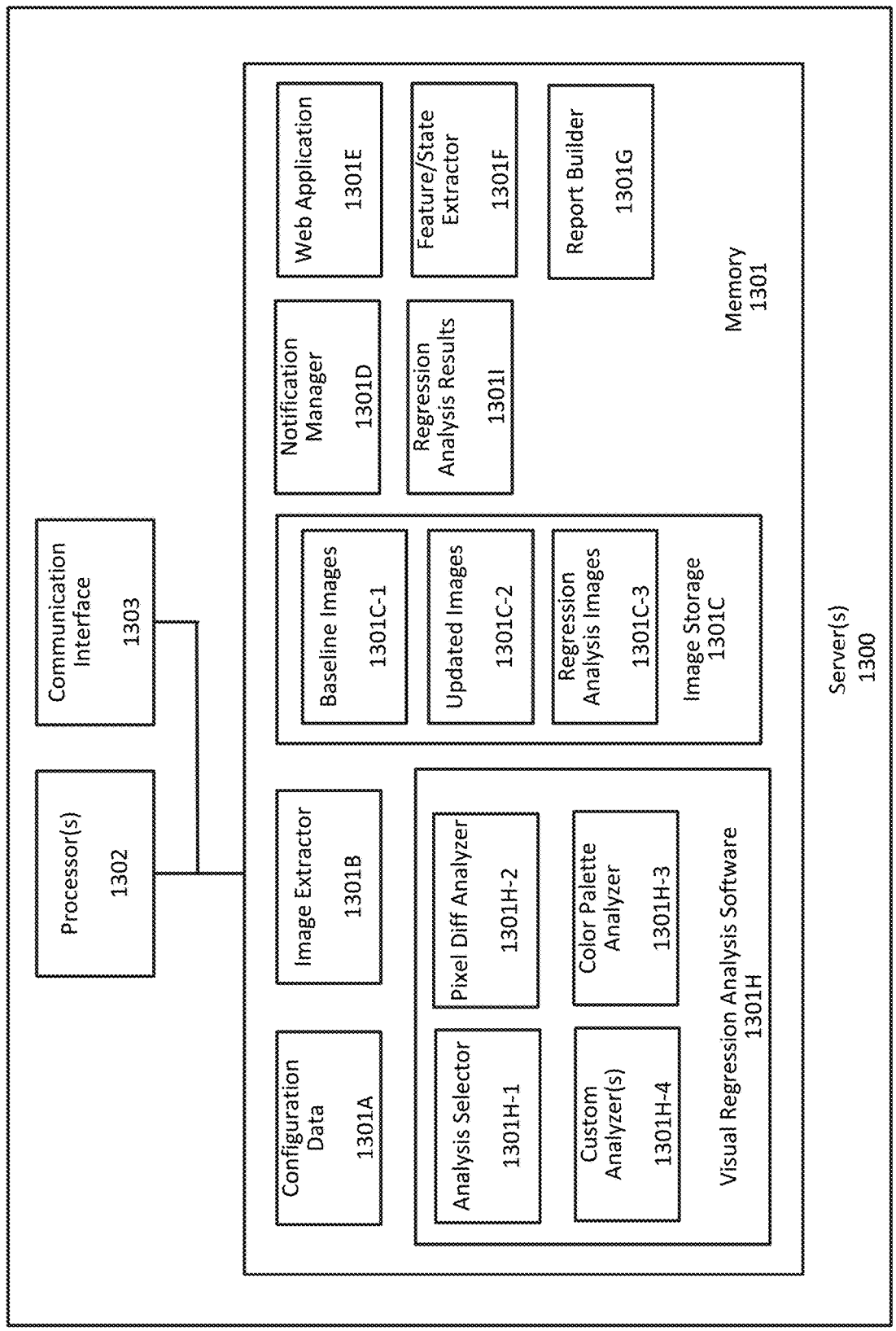
FIG. 13 illustrates a server-side computing environment for maintaining visual consistency of a presentation layer of an application according to an exemplary embodiment.

FIG. 13 illustrates a server-side computing environment for maintaining visual consistency of a presentation layer of an application according to an exemplary embodiment. Server-side computing environment 1300 includes a memory 1301 that is a non-transitory computer-readable medium and can be volatile memory (e.g., registers, cache, RAM), non-volatile memory (e.g., ROM, EEPROM, flash memory, etc.), or some combination of the two.

As shown in FIG. 13, memory 1301 includes configuration data 1301A, image extractor software 1301B, image storage 1301C (including baseline images 1301C-1, updated images 1301C-2, and regression analysis images 1301C-3), notification manager software 1301D, web application software 1301E, feature/state extractor software 1301F, report builder software 1301G, and visual regression analysis software 1301H.

Report builder software 1301G allows user to create custom reports using a report generation tool provided by the system's web application interface. A user can generate a report between a date range, or by selecting two different analysis runs. The user building a report can choose to display all of a project's analysis results or select specific features and states for their report. The report generation tool allows client-side user's to pick which analysis metrics to display in the report, as well as add their own comments to each feature comparison results page.

The reporting solution is especially useful for companies that produce validated software. For example, during release validation, customers can expect a certain type of deliverable to ensure that the system continues to work as expected between releases. A report can be generated that highlights all of the major changes to the application experience between a release. These visual changes can then be linked to the user stories for full traceability.

Visual regression analysis software 1301H includes an analysis selector 1301H-1, a pixel differential analyzer 1301H-2, a color palette analyzer 1301H-3, and one or more custom analyzers 1301H-4.

The pixel differential analyzer 1301H-2 essentially compares the baseline image with the new image pixel by pixel. The plugin can calculate numbers of different pixels and percent difference between the two images. KPI thresholds can be configured for the percent difference. For example, if the percent pixel difference between the baseline and new image breaches 5%, a notification can be sent to interested parties. Any KPI breach can also be included in the API response payload in the event of a synchronous analysis.

The color palette analyzer 1301H-3 analyzes the new image being analyzed and produces a color palette of all the colors used in the new image. It then compares the list of colors against the expected color palette configured for the given feature state. A KPI may be enabled to notify interested parties if the new image being analyzed does not match the expected color palette configured for the feature state. Any KPI breach can also be included in the API response payload in the event of a synchronous analysis.

By default, the system can provide the pixel differential analyzer 1301H-2 and color palette analyzer 1301H-3. The system can also allow developers to write their own custom analysis software that can be plugged into the visual analysis software.

All of the software stored within memory 1301 can be stored as a computer-readable instructions, that when executed by one or more processors, cause the processors to perform the functionality described with respect to FIGS. 1-12.

Computing environment 1300 further includes one or more processors 1302. The processors execute computer-executable instructions and can be a real or virtual processors. In a multi-processing system, multiple processors or multicore processors can be used to execute computer-executable instructions to increase processing power and/or to execute certain software in parallel.

The computing environment additionally includes a communication interface 1303, such as a network interface, which is used to monitor network communications, communicate with devices on a computer network, collect data from devices on the network, and send notifications to client-side devices. As discussed earlier, the communication interface 1303 can include a RESTful interface. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As discussed above, users on the client-side computing device(s) can communicate with the server-side computing device(s) via a RESTful interface or via web application hosted by the server-side computing device. All of the features provided in the web-based UI are also performable with the RESTful interface. This includes, but is not limited to:

Creating a new project;
Adding feature(s) for a project;
Adding state(s) for a given feature and establishing the baseline image;
Updating a baseline image for a feature state;
Performing a synchronous or asynchronous analysis against a baseline on a feature state(s), optionally updating with a new baseline image;
Checking the status of an asynchronous analysis;
Creating an analysis job group to collate multiple analyses;
Configuring which type of analysis should be performed when analysis occurs (can be project-global, feature-global, or configured for an individual feature state);
Configuring KPIs for each analysis type for a feature state; and
Configuring notifications when thresholds are breached.

Computing environment 1300 can further includes input and output interfaces that allow users (such as system administrators) to provide input to the system and display or otherwise transmit information for display to users. For example, system administrators can utilize input/output interfaces to configure rules or notifications. The current settings can also be displayed to users via input/output interfaces. Computing environment 1300 can also include a display with a graphical user interface (GUI) that presents options to users such as system administrators for configuration purposes. The GUI can also be configured to display alerts/notifications that are transmitted.

An interconnection mechanism (shown as a solid line in FIG. 13), such as a bus, controller, or network interconnects the components of the computing environment 1300.

Input and output interfaces can be coupled to input and output devices. The input device(s) can be a touch input device such as a keyboard, mouse, pen, trackball, touch screen, or game controller, a voice input device, a scanning device, a digital camera, remote control, or another device that provides input to the computing environment. The output device(s) can be a display, television, monitor, printer, speaker, or another device that provides output from the computing environment 1300.

The computing environment 1300 can additionally utilize a removable or non-removable storage, such as magnetic disks, magnetic tapes or cassettes, CD-ROMs, CD-RWs, DVDs, USB drives, or any other medium which can be used to store information and which can be accessed within the computing environment 1300.

Figure 14:
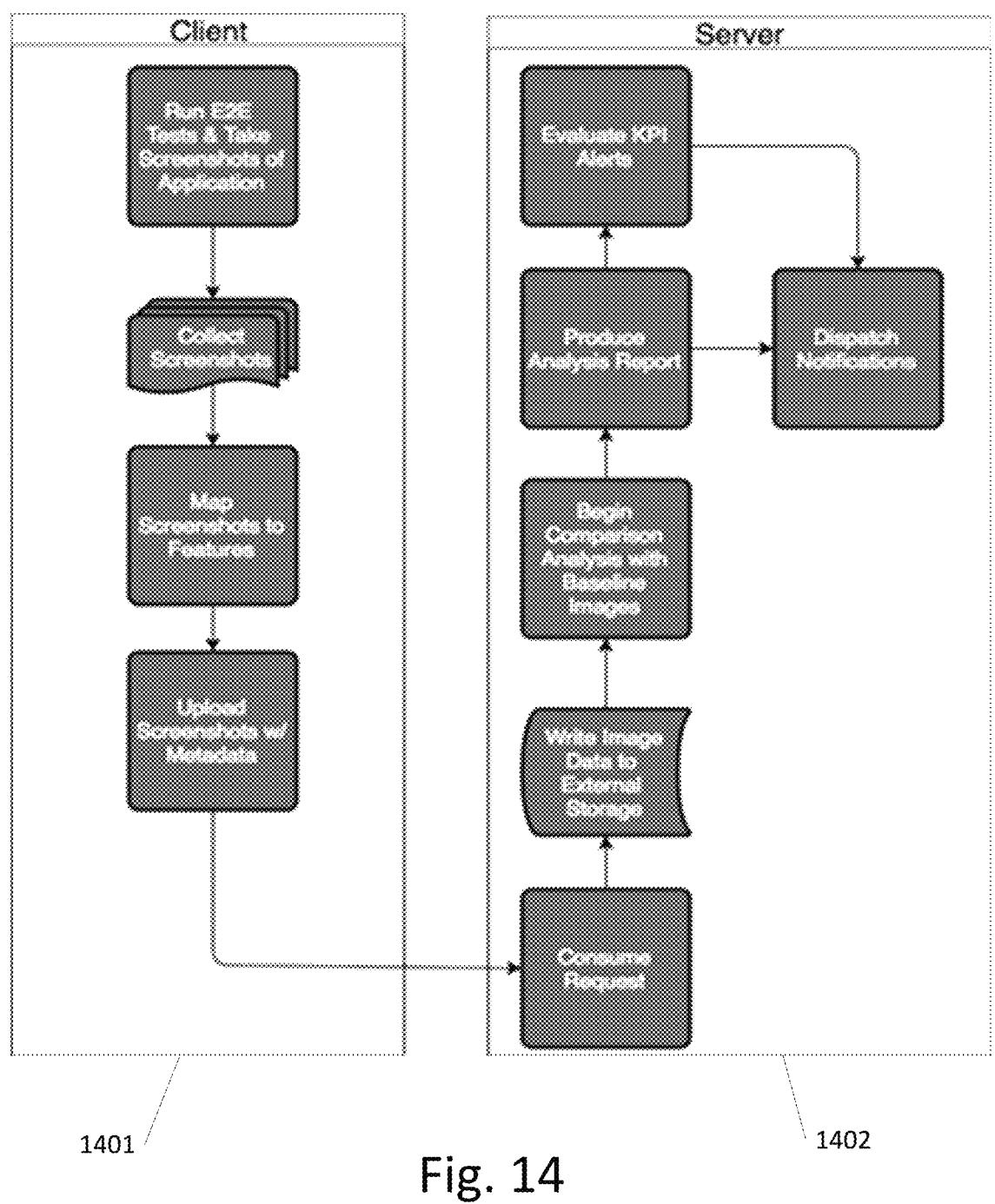
FIG. 14 illustrates a diagram showing interactions between a client-side device and a server-side device according to an exemplary embodiment.

The computing environment 1300 can be a set-top box, personal computer, or one or more servers, for example a farm of networked servers, a clustered server environment, or a cloud network of computing devices FIG. 14 illustrates a diagram showing interactions between a client-side device 1401 and a server-side device 1402 according to an exemplary embodiment.

Client-side device 1401 can include client libraries, written in Java and JavaScript (Node.js), for example, that make it easier to programmatically interface with the system over REST, manage a project catalog, and perform image analysis. Using these client libraries, a developer can build an end-to-end (e2e) test suite to navigate about an application, taking screenshots of interested areas and uploading them into the system to perform automatic analysis. This further reduces the barrier to allow feature analysis to occur in a CI pipeline, tracking changes between commits in Source Control Management (SCM) software.

The present system offers many advantages, including a RESTful server that provides a centralized, easy-to-integrate system, dynamic real-time feedback of visual changes with notifications, novel data structures for tracking projects and their features and states, and custom report generation of project progression over time.

Previously, manual visual regression would be delegated to multiple testers, with someone consolidating all of the results into a central location, whether it be a binder or stored digitally. With this solution, all of the screenshots and analysis data is kept in a centralized location.

The RESTful server solution allows for greater flexibility when capturing screenshots of a project's feature set. Users of this system can use their own test-runners and screenshot capturing tools against the browsers of their choice. The barriers of integration with the system is low.

For example, this solution can be integrated into a build pipeline to produce rapid feedback for areas of interest. Sometimes, a release will focus only on specific components of a web application. Comparisons can be slimmed down to analyze only these "hot" areas and integrated into a build pipeline for smoke testing. This allows users to ensure that the agreed designs are being implemented as planned and that they adhere to a style guide within a sprint.

The system additionally provides novel data structures for tracking visual elements within a project, allowing users to describe not just features, but also the various representations a feature may have. Whether it be various functional states, differing resolutions, or multiple browsers—the system's web application interface allows for easy navigation of project features and their varying states over time. Users can navigate to a specific representation of a feature and view its most recent analysis, review historical analysis runs, or even start a new analysis of two different baselines already in the system.

Another advantage of the system is dynamic and real-time notification ability. Bringing problem areas to light quicker with automated notifications reduces the amount of "backtracking and fixing" after a developer has already moved onto another feature story. Developers can be notified with an analysis report if a configured KPI is breached for a feature or set of features. If a problem area does require fixing, realizing it sooner will prevent it from becoming a blocker during release.

Validated systems almost always prevent products from releasing at a quicker pace, such as every sprint, as opposed to every quarter. One reason is that validated systems require regression testing and the production of a validation package to give to customers. The report generator feature allows a validation engineer to create custom reports and deliver them as part of a release package.

This system can also produce analysis reports as part of its notification feature that highlights areas of a project that may have unexpectedly changed, pointing testers to areas of the application that may have regression issues. The network and software architecture of the present system enables continuous automatic analysis and delivery of analysis and feedback.

The disclosed server-side system can also include functionality for automated validation testing and reporting that builds upon the analysis, notification, and reporting features disclosed herein. In particular, the systems and techniques disclosed herein are useful in Agile development environments.

FDA regulations (and similar regulations from regulatory bodies around the world) mandate the need to complete Computer System Validation (CSV) to meet requirements related to Good Manufacturing Practices (GMP) and the presence of a Quality System for the delivery of Medical Device and Pharmaceutical Products to the market.

A key aspect to Software Validation as defined by the FDA is "confirmation by examination and provision of objective evidence that software specifications conform to user needs and intended uses, and that the particular requirements implemented through software can be consistently fulfilled." (reference General Principles of Software Validation; Final Guidance for Industry and FDA Staff, published Jan. 11, 2002 by US Dept. of Health and Human Services; Food and Drug Administration)

Traditional methods for CSV in regulated industries include a lengthy process typically executed at the end of a release cycle to create and manually execute Installation Qualifications (IQs), Operational Qualifications (OQs) and Performance Qualifications (PQs); sometimes referred to as user-acceptance testing or UAT. This process typically requires members of the quality engineering organization to execute tests, document results and package up as part of a customer delivered validation package. As part of the documentation process the OQs and PQs needs to show traceability from the functional requirements and acceptance criteria to the tests that were executed and evidence of test execution and results. To provide the evidence required by organizations auditing to the FDA regulations, these tests are usually manually executed and signed off by a human who is verifying the results.

As the software industry has matured to adopt agile development methodologies, the existing industry acceptable methods of manually executed tests done in a serial fashion (typically as the final stage of the development process) conflict with the methodologies brought forth by Agile that promote quality activities to occur while code is being developed during much shorter time increments.

The main concept of Agile methodologies for software development or systems implementation is taking long running projects (e.g., 1 year) and breaking them up into very small increments called sprints (e.g., 2 weeks). During those sprints, all of the steps of development are performed a much more focused problem set. This includes requirements, implementation, testing, documentation, and validation testing.

Since all the steps are performed in smaller increments, Agile operations have streamlined the testing aspect with automation so that they can get through more testing more often (instead of testing everything at the end of the release).

Some of the benefits of this are working software at all stages of development, which allows for customer feedback through the release and an increase in quality by identifying defects closer to when they are introduced.

The techniques and methods described herein can be used to perform validation testing in small, continuous, increments. This allows users to locate issues closer to when they are introduced and to expedite the final validation process.

A shorter validation cycle is attractive to regulated industries because today the validation cycle can cost almost as much as the project itself (Due to its manual labor intensive process).

Figure 15:
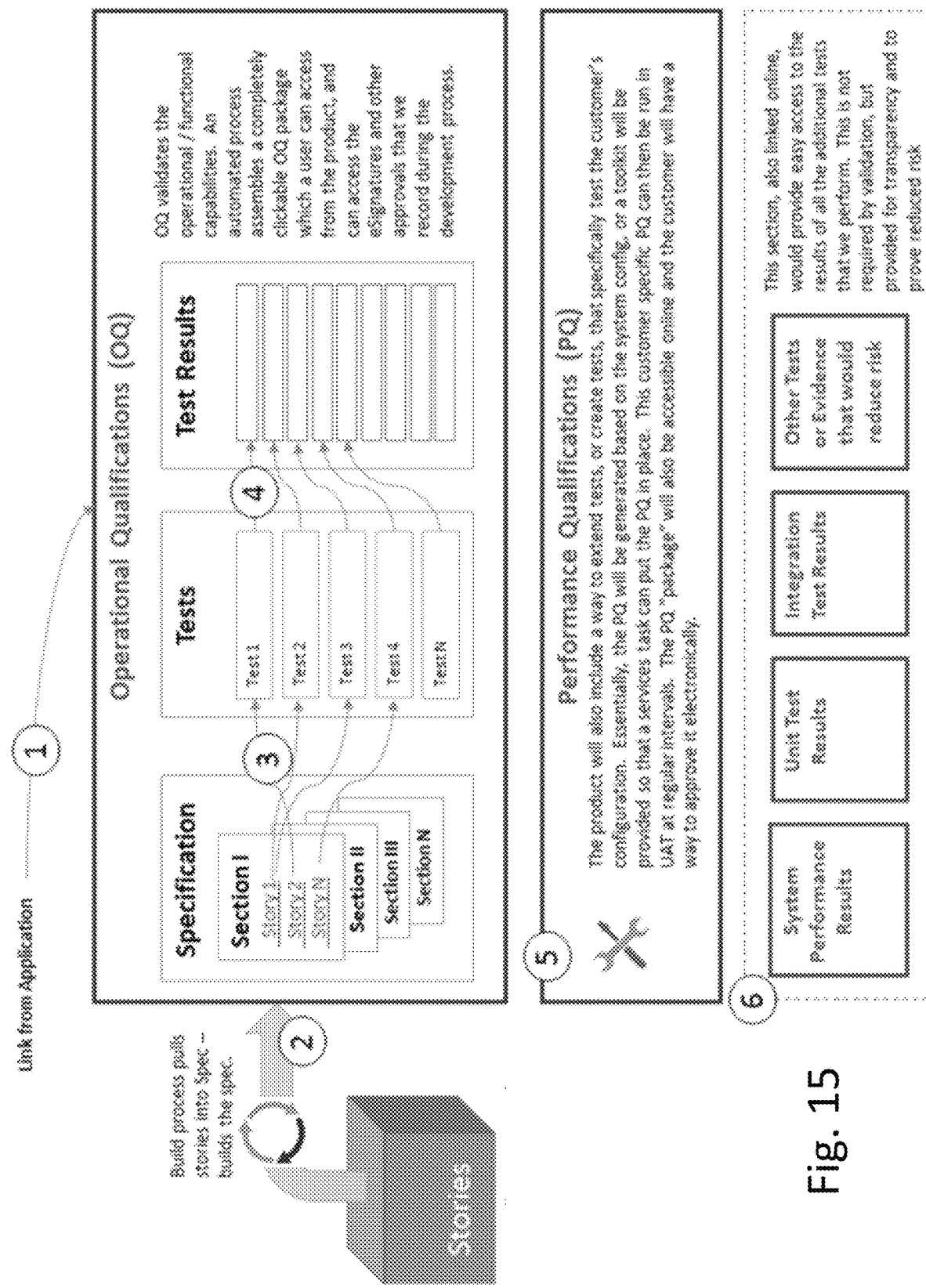
FIG. 15 illustrates an example of automated Computer System Validation (CSV) system that utilizes the systems and methods disclosed herein according to an exemplary embodiment.

FIG. 15 illustrates an example of automated Computer System Validation (CSV) system that utilizes the systems and method disclosed herein according to an exemplary embodiment.

As shown in FIG. 15, the automated CSV process first builds specifications that leverage the standard data (User Stories) that an Agile team takes to document what the system's intended use is. The automated process assembles a specification that can be interpreted by a regulator using the existing data from the software vendor's Software Development Lifecycle (SDLC) without requiring them to maintain a separate document.

The automated CSV process then automatically executes the actual tests which include the generation of evidence that the test was executed correctly and the results were as expected. This step can be performed continuously and automatically. For example, in the context of visual consistency testing, images from each "sprint" can be automatically uploaded to the server-side device, used to perform visual regression analysis relative to baseline images, and then compile the results.

To provide more detail on FIG. 15, instead of writing and maintaining a completely separate specification describing the function of a product, User Stories which are usually kept in a system are re-used. Collections of User Stories are grouped as part of an Epic. For example, one such Epic might be Login. And under the Epic Login, there might be 10 User Stories. The system would query the User Story repository to obtain all of the User Stories for the Epic Login. A tag system can be used to further categorize and group user stories. An exclude tag (# exclude) would also be used when a story has been superseded by newer stories. The result would be a list of User Stories that describe the system that are grouped by Epic. The following table gives an example of user stories:

| Epic | Release # | Tags | User Story | Link to Test |
|---|---|---|---|---|
| User Profile | 1000 | #change-pw #obsolete | Given user navigates to profile page When user clicks on edit password link Then user may enter new password AND clicks save | \<Link to test case here\> |
| User Profile | 1010 | #change-pw #obsolete | Given user is on edit password page When user saves a password Then the system evaluates if the password meets the predefined password policy rules and returns a success or failure status to the user | \<Link to test case here\> |
| User Profile | 1200 | #change-pw | Given user is on edit password page When user enters a new password Then the system evaluates the password against the predefined password policy rules as the user is typing AND does not allow the user to save unless it meets all rules. | \<Link to test case here\> |
| User Profile | 1011 | #contactinfo | Given user navigates to profile page When user clicks on contact info Then user may enter or update their email address | \<Link to test case here\> |
| User Profile | 1012 | #contactinfo | Given user navigates to profile page When user clicks on contact info Then user may enter or update their address, building number, phone number and profile picture | \<Link to test case here\> |
| User Profile | 1015 | #contactinfo | Given user navigates to profile page When user clicks on contact info AND a phone number is already listed Then user will have the ability to add additional phone numbers and designate a label for each phone number | \<Link to test case here\> |
| Login | 900 | | Given user is part of the network directory AND single-sign on in the system profile is set to ON When user accesses the login URL she will be automatically directed to the application and will bypass the username/password authentication screen | \<Link to test case here\> |
| Login | 802 | | Given user navigates to the application URL When user enters their username and password and presses submit Then the system will authenticate the user credentials against the previously saved username/password combination | \<Link to test case here\> |

The system would then sort this data based on release number and group it based on Epic and then tag. If the system encounters a record that includes the tag #obsolete, it will exclude it. The system then formats this data into a traditional looking specification, as shown in the table below:

| 1. User Profile Contact Info | | |
|---|---|---|
| User Profile | Given user navigates to profile page When user clicks on contact info Then user may enter or update their email address | \<Link to test case here\> |
| User Profile | Given user navigates to profile page When user clicks on contact info Then user may enter or update their address, building number, phone number and profile picture | \<Link to test case here\> |
| User Profile | Given user navigates to profile page When user clicks on contact info AND a phone number is already listed Then user will have the ability to add additional phone numbers and designate a label for each phone number | \<Link to test case here\> |
| Change Pw | | |
| User Profile | Given user is on edit password page When user enters a new password Then the system evaluates the password against the predefined password policy rules as the user is typing AND does not allow the user to save unless it meets all rules. | \<Link to test case here\> |
| 2. Login | | |
| Login | Given user is part of the network directory AND single-sign on in the system profile is set to ON When user accesses the login URL she will be automatically directed to the application and will bypass the username/password authentication screen | \<Link to test case here\> |
| Login | Given user navigates to the application URL When user enters their username and password and presses submit Then the system will authenticate the user credentials against the previously saved username/password combination | \<Link to test case here\> |

The linked tests would then be automatically executed, with the results being packaged in the required format. For example, in the case of visual regression analysis, a specification can indicate that a color palette should remain consistent throughout the login process. This specification would then link the relevant visual regression analysis, which would be automatically updated after each segment of the Agile development cycle. In this case, the one or more images and associated metadata that are received from the one or more client-side computing devices on an automated basis correspond to an entry in an Operational Qualifications (OQ) specification and the visual regression analysis performed between each image in the one or more images and the corresponding baseline image is determined based at least in part on a link stored in the corresponding entry of the OQ specification.

The results would be automatically packaged into a validation package that is accessed by the customer in an online fashion (such as through the web application). All records will be electronic and would conform to the requirements of part 11 of Title 21 of the Code of Federal Regulations; Electronic Records; Electronic Signatures (21 CFR Part 11).

The resulting package can include:
An Operational Qualifications (OQ) package.
Specification with functional stories and acceptance criteria describing the system organized in a readable fashion.
Each story in the specification is linked to the tests that prove it. Tests can be human readable even though they will be executed by a machine.
Each test is linked to a set of test results. The results that were run by the software manufacturer in a controlled environment.
A Base Performance Qualifications (PQ) package.
The PQ package can include a number of tests and results for processes out of the box.
The Base PQ package can be extendable by customers so that they can inject their configurations and re-execute the tests for more complete regulatory compliance.
Additional Package Items can include system performance testing results, development delivered unit test execution results, and development delivered integration test execution results.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more server-side computing devices for maintaining visual consistency of a presentation layer, the method comprising:
receiving, by at least one of the one or more server-side computing devices, one or more images and associated metadata from one or more client-side computing devices, the associated metadata indicating a corresponding feature and a corresponding state for each image in the one or more images;
retrieving, by at least one of the one or more server-side computing devices, a baseline image corresponding to each image in the one or more images from a server-side memory based on the corresponding feature and the corresponding state for each image;
performing, by at least one of the one or more server-side computing devices, a visual regression analysis between each image in the one or more images and the corresponding baseline image to determine one or more values of one or more indicators;
identifying, by at least one of the one or more server-side computing devices, at least one key performance indicator in the one or more indicators based at least in part on one or more user settings associated with the one or more client-side computing devices;
determining, by at least one of the one or more server-side computing devices, whether at least one value of the at least one key performance indicator is outside of a predetermined range of values defined in the one or more user settings or does not match an expected value defined in the one or more user settings; and
transmitting, by at least one of the one or more server-side computing devices, the one or more alerts to at least one of the one or more client-side computing devices based at least in part on a determination that the at least one value of the at least one key performance indicator is outside of the predetermined range of values defined in the one or more user settings or does not match the expected value defined in the one or more user settings.

2. The method of claim 1, further comprising:
receiving, by at least one of the one or more server-side computing devices, one or more baseline images and associated baseline metadata from at least one of the one or more client-side computing devices;
analyzing, by at least one of the one or more server-side computing devices, the associated baseline metadata to identify a corresponding feature and a corresponding state for each baseline image in the one or more baseline images; and
storing, by at least one of the one or more server-side computing devices, each baseline image in the one or more baseline images in the server-side memory, each baseline image being associated with the corresponding feature and the corresponding state in the server-side memory.

3. The method of claim 1, further comprising, subsequent to receiving one or more images and associated metadata from one or more client-side computing devices:
persisting, by at least one of the one or more server-side computing devices, each image in the one or more images to the server-side memory; and
transmitting, by at least one of the one or more server-side computing devices, one or more analysis identifiers corresponding to the one or more images to at least one of the one or more client-side computing devices.

4. The method of claim 1, further comprising:
storing, by at least one of the one or more server-side computing devices, results of the visual regression analysis between each image in the one or more images and the corresponding baseline image on the server-side memory.

5. The method of claim 1, wherein receiving one or more images and associated metadata from one or more client-side computing devices comprises:
receiving a screenshot and image location metadata from at least one of the one or more client-side computing devices, the image location metadata indicating a location of each image in the one or more images within the screenshot; and
extracting the one or more images from the screenshot based at least in part on the image location metadata.

6. The method of claim 1, wherein retrieving a baseline image corresponding to each image in the one or more images from a server-side memory based on the corresponding feature and the corresponding state for each image comprises:
parsing the associated metadata to extract the corresponding feature and the corresponding state for each image; and
retrieving the baseline image corresponding to each image based at least in part on the corresponding extracted feature and the corresponding extracted state.

7. The method of claim 1, wherein performing a visual regression analysis between each image in the one or more images and the corresponding baseline image to determine one or more values of one or more indicators comprises, for each image:
determining a visual regression analysis technique based at least in part on one or more of: the corresponding feature, the corresponding state, or a project associated with the corresponding feature;
applying the determined visual regression analysis technique to the corresponding baseline image and the image; and
determining the one or more values of the one or more indicators based on results of the determined visual regression analysis.

8. The method of claim 1, wherein the one or more user settings associated with the one or more client-side computing devices comprise settings provided by at least one user of at least one client-side computing device in the one or more client-side computing devices and stored on at least one server-side computing device in the one or more server-side computing devices.

9. The method of claim 1, wherein the one or more server-side computing devices interface with the one or more client-side computing devices via a Representational State Transfer (REST) interface.

10. The method of claim 1, wherein the one or more images and associated metadata are received from the one or more client-side computing devices on an automated basis and correspond to an entry in an Operational Qualifications (OQ) specification and wherein the visual regression analysis performed between each image in the one or more images and the corresponding baseline image is determined based at least in part on a link stored in the corresponding entry of the OQ specification.

11. A server-side apparatus for maintaining visual consistency of a presentation layer, the server-side apparatus comprising:
one or more processors; and
one or more memories operatively coupled to at least one of the one or more processors and having instructions stored thereon that, when executed by at least one of the one or more processors, cause at least one of the one or more processors to:
receive one or more images and associated metadata from one or more client-side computing devices, the associated metadata indicating a corresponding feature and a corresponding state for each image in the one or more images;
retrieve a baseline image corresponding to each image in the one or more images from a server-side memory based on the corresponding feature and the corresponding state for each image;
perform a visual regression analysis between each image in the one or more images and the corresponding baseline image to determine one or more values of one or more indicators;
identify at least one key performance indicator in the one or more indicators based at least in part on one or more user settings associated with the one or more client-side computing devices;
determine whether at least one value of the at least one key performance indicator is outside of a predetermined range of values defined in the one or more user settings or does not match an expected value defined in the one or more user settings; and
transmit the one or more alerts to at least one of the one or more client-side computing devices based at least in part on a determination that the at least one value of the at least one key performance indicator is outside of the predetermined range of values defined in the one or more user settings or does not match the expected value defined in the one or more user settings.

12. The server-side apparatus of claim 11, wherein at least one of the one or more memories has further instructions stored thereon that, when executed by at least one of the one or more processors, cause at least one of the one or more processors to:

receive one or more baseline images and associated baseline metadata from at least one of the one or more client-side computing devices;

analyze the associated baseline metadata to identify a corresponding feature and a corresponding state for each baseline image in the one or more baseline images; and store each baseline image in the one or more baseline images in the server-side memory, each baseline image being associated with the corresponding feature and the corresponding state in the server-side memory.

13. The server-side apparatus of claim 11, wherein at least one of the one or more memories has further instructions stored thereon that, when executed by at least one of the one or more processors, cause at least one of the one or more processors to, subsequent to receiving one or more images and associated metadata from one or more client-side computing devices:

persist each image in the one or more images to the server-side memory; and transmit one or more analysis identifiers corresponding to the one or more images to at least one of the one or more client-side computing devices.

14. The server-side apparatus of claim 11, wherein at least one of the one or more memories has further instructions stored thereon that, when executed by at least one of the one or more processors, cause at least one of the one or more processors to:

store results of the visual regression analysis between each image in the one or more images and the corresponding baseline image on the server-side memory.

15. The server-side apparatus of claim 11, wherein the instructions that, when executed by at least one of the one or more processors, cause at least one of the one or more processors to receive one or more images and associated metadata from one or more client-side computing devices further cause at least one of the one or more processors to:

receive a screenshot and image location metadata from at least one of the one or more client-side computing devices, the image location metadata indicating a location of each image in the one or more images within the screenshot; and extract the one or more images from the screenshot based at least in part on the image location metadata.

16. The server-side apparatus of claim 11, wherein the instructions that, when executed by at least one of the one or more processors, cause at least one of the one or more processors to retrieve a baseline image corresponding to each image in the one or more images from a server-side memory based on the corresponding feature and the corresponding state for each image further cause at least one of the one or more processors to:

parse the associated metadata to extract the corresponding feature and the corresponding state for each image; and retrieve the baseline image corresponding to each image based at least in part on the corresponding extracted feature and the corresponding extracted state.

17. The server-side apparatus of claim 11, wherein the instructions that, when executed by at least one of the one or more processors, cause at least one of the one or more processors to perform a visual regression analysis between each image in the one or more images and the corresponding baseline image to determine one or more values of one or more indicators further cause at least one of the one or more processors to:

determine a visual regression analysis technique based at least in part on one or more of: the corresponding feature, the corresponding state, or a project associated with the corresponding feature; and apply the determined visual regression analysis technique to the corresponding baseline image and the image; and determine the one or more values of the one or more indicators based on results of the determined visual regression analysis.

18. The server-side apparatus of claim 11, wherein the one or more user settings associated with the one or more client-side computing devices comprise settings provided by at least one user of at least one client-side computing device in the one or more client-side computing devices and stored on at least one server-side computing device in the one or more server-side computing devices.

19. The server-side apparatus of claim 11, wherein the one or more server-side computing devices interface with the one or more client-side computing devices via a Representational State Transfer (REST) interface.

20. The server-side apparatus of claim 11, wherein the one or more images and associated metadata are received from the one or more client-side computing devices on an automated basis and correspond to an entry in an Operational Qualifications (OQ) specification and wherein the visual regression analysis performed between each image in the one or more images and the corresponding baseline image is determined based at least in part on a link stored in the corresponding entry of the OQ specification.

21. At least one non-transitory computer-readable medium storing computer-readable instructions that, when executed by one or more server-side computing devices, cause at least one of the one or more server-side computing devices to:

receive one or more images and associated metadata from one or more client-side computing devices, the associated metadata indicating a corresponding feature and a corresponding state for each image in the one or more images;

retrieve a baseline image corresponding to each image in the one or more images from a server-side memory based on the corresponding feature and the corresponding state for each image;

perform a visual regression analysis between each image in the one or more images and the corresponding baseline image to determine one or more values of one or more indicators;

identify at least one key performance indicator in the one or more indicators based at least in part on one or more user settings associated with the one or more client-side computing devices;

determine whether at least one value of the at least one key performance indicator is outside of a predetermined range of values defined in the one or more user settings or does not match an expected value defined in the one or more user settings; and transmit the one or more alerts to at least one of the one or more client-side computing devices based at least in part on a determination that the at least one value of the at least one key performance indicator is outside of the predetermined range of values defined in the one or more user settings or does not match the expected value defined in the one or more user settings.

22. The at least one non-transitory computer-readable medium of claim 21, further storing computer-readable instructions that, when executed by at least one of the one or more server-side computing devices, cause at least one of the one or more server-side computing devices to:
- receive one or more baseline images and associated baseline metadata from at least one of the one or more client-side computing devices;
- analyze the associated baseline metadata to identify a corresponding feature and a corresponding state for each baseline image in the one or more baseline images; and
- store each baseline image in the one or more baseline images in the server-side memory, each baseline image being associated with the corresponding feature and the corresponding state in the server-side memory.

23. The at least one non-transitory computer-readable medium of claim 11, wherein at least one of the one or more memories has further instructions stored thereon that, when executed by at least one of the one or more server-side computing devices, cause at least one of the one or more server-side computing devices to, subsequent to receiving one or more images and associated metadata from one or more client-side computing devices:
- persist each image in the one or more images to the server-side memory; and
- transmit one or more analysis identifiers corresponding to the one or more images to at least one of the one or more client-side computing devices.

24. The at least one non-transitory computer-readable medium of claim 21, further storing computer-readable instructions that, when executed by at least one of the one or more server-side computing devices, cause at least one of the one or more server-side computing devices to:
- store results of the visual regression analysis between each image in the one or more images and the corresponding baseline image on the server-side memory.

25. The at least one non-transitory computer-readable medium of claim 21, wherein the instructions that, when executed by at least one of the one or more server-side computing devices, cause at least one of the one or more server-side computing devices to receive one or more images and associated metadata from one or more client-side computing devices further cause at least one of the one or more server-side computing devices to:
- receive a screenshot and image location metadata from at least one of the one or more client-side computing devices, the image location metadata indicating a location of each image in the one or more images within the screenshot; and
- extract the one or more images from the screenshot based at least in part on the image location metadata.

26. The at least one non-transitory computer-readable medium of claim 21, wherein the instructions that, when executed by at least one of the one or more server-side computing devices, cause at least one of the one or more server-side computing devices to retrieve a baseline image corresponding to each image in the one or more images from a server-side memory based on the corresponding feature and the corresponding state for each image further cause at least one of the one or more server-side computing devices to:
- parse the associated metadata to extract the corresponding feature and the corresponding state for each image; and
- retrieve the baseline image corresponding to each image based at least in part on the corresponding extracted feature and the corresponding extracted state.

27. The at least one non-transitory computer-readable medium of claim 21, wherein the instructions that, when executed by at least one of the one or more server-side computing devices, cause at least one of the one or more server-side computing devices to perform a visual regression analysis between each image in the one or more images and the corresponding baseline image to determine one or more values of one or more indicators further cause at least one of the one or more server-side computing devices to:
- determine a visual regression analysis technique based at least in part on one or more of:
  - the corresponding feature, the corresponding state, or a project associated with the corresponding feature; and
- apply the determined visual regression analysis technique to the corresponding baseline image and the image; and
- determine the one or more values of the one or more indicators based on results of the determined visual regression analysis.

28. The at least one non-transitory computer-readable medium of claim 21, wherein the one or more user settings associated with the one or more client-side computing devices comprise settings provided by at least one user of at least one client-side computing device in the one or more client-side computing devices and stored on at least one server-side computing device in the one or more server-side computing devices.

29. The at least one non-transitory computer-readable medium of claim 21, wherein the one or more server-side computing devices interface with the one or more client-side computing devices via a Representational State Transfer (REST) interface.

30. The at least one non-transitory computer-readable medium of claim 21, wherein the one or more images and associated metadata are received from the one or more client-side computing devices on an automated basis and correspond to an entry in an Operational Qualifications (OQ) specification and wherein the visual regression analysis performed between each image in the one or more images and the corresponding baseline image is determined based at least in part on a link stored in the corresponding entry of the OQ specification.

* * * * *